United States Patent
Ando et al.

(10) Patent No.: US 10,120,518 B2
(45) Date of Patent: Nov. 6, 2018

(54) TOUCH PANEL

(71) Applicant: Murata Manufacturing Co., Ltd., Nagaokakyo-shi, Kyoto-fu (JP)

(72) Inventors: Masamichi Ando, Nagaokakyo (JP); Kenichi Mori, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 15 days.

(21) Appl. No.: 15/379,588

(22) Filed: Dec. 15, 2016

(65) Prior Publication Data
US 2017/0097704 A1   Apr. 6, 2017

Related U.S. Application Data

(63) Continuation of application No. PCT/JP2015/066810, filed on Jun. 11, 2015.

(30) Foreign Application Priority Data

Jul. 2, 2014 (JP) .................. 2014-136714

(51) Int. Cl.
*G06F 3/044* (2006.01)
*B32B 7/12* (2006.01)
(Continued)

(52) U.S. Cl.
CPC ............. *G06F 3/044* (2013.01); *B32B 7/12* (2013.01); *B32B 25/08* (2013.01); *B32B 25/12* (2013.01);
(Continued)

(58) Field of Classification Search
None
See application file for complete search history.

(56) References Cited

U.S. PATENT DOCUMENTS

| 6,242,504 B1 | 6/2001 | Meyer-Roscher et al. |
| 6,891,530 B2 | 5/2005 | Umemoto et al. |

(Continued)

FOREIGN PATENT DOCUMENTS

| JP | H05-179205 A | 7/1993 |
| JP | H11-189664 A | 7/1999 |

(Continued)

OTHER PUBLICATIONS

International Search Report issued for PCT/JP2015/066810, dated Jul. 14, 2015.
(Continued)

*Primary Examiner* — Kenneth B Lee, Jr.
(74) *Attorney, Agent, or Firm* — Arent Fox LLP

(57) ABSTRACT

A touch panel that includes a plate member which includes a first principal surface and a second principal surface opposing each other, and is constructed so as to be distorted in response to a force applied to the first principal surface; a main functional unit having piezoelectric voltage detection electrodes disposed on opposed sides of a piezoelectric film and which detect a piezoelectric voltage corresponding to a distortion amount of the piezoelectric film; and an adhesive layer which adheres the plate member and the main functional unit, the adhesive layer being divided into a plurality of areas, and at least two areas have different moduli.

17 Claims, 14 Drawing Sheets

(51) Int. Cl.

| | | |
|---|---|---|
| *B32B 25/08* | (2006.01) | |
| *B32B 25/12* | (2006.01) | |
| *B32B 25/20* | (2006.01) | |
| *B32B 27/08* | (2006.01) | |
| *B32B 27/18* | (2006.01) | |
| *B32B 27/28* | (2006.01) | |
| *B32B 27/30* | (2006.01) | |
| *B32B 27/32* | (2006.01) | |
| *B32B 27/36* | (2006.01) | |

(52) U.S. Cl.
CPC .............. *B32B 25/20* (2013.01); *B32B 27/08* (2013.01); *B32B 27/18* (2013.01); *B32B 27/283* (2013.01); *B32B 27/308* (2013.01); *B32B 27/32* (2013.01); *B32B 27/36* (2013.01); *B32B 27/365* (2013.01); *B32B 2250/44* (2013.01); *B32B 2307/20* (2013.01); *B32B 2307/412* (2013.01); *B32B 2307/516* (2013.01); *B32B 2307/704* (2013.01); *B32B 2307/732* (2013.01); *B32B 2457/208* (2013.01); *G06F 2203/04103* (2013.01); *G06F 2203/04105* (2013.01); *G06F 2203/04106* (2013.01)

(56) References Cited

U.S. PATENT DOCUMENTS

| | | | |
|---|---|---|---|
| 7,405,246 | B2 | 7/2008 | Rubinsztajn |
| 9,110,532 | B2 | 8/2015 | Ando et al. |
| 9,348,473 | B2 | 5/2016 | Ando |
| 9,417,737 | B2 | 8/2016 | Ando et al. |
| 9,430,099 | B2 | 8/2016 | Ando et al. |
| 9,575,608 | B2 | 2/2017 | Ando et al. |
| 2002/0180711 | A1* | 12/2002 | Umemoto ............ G02B 6/0036 345/173 |
| 2006/0223933 | A1 | 10/2006 | Rubinsztajn |
| 2013/0057499 | A1* | 3/2013 | Ando ..................... G06F 3/038 345/173 |
| 2014/0152618 | A1 | 6/2014 | Ando |
| 2015/0042590 | A1* | 2/2015 | Ando ................... G06F 3/0354 345/173 |
| 2015/0193055 | A1 | 7/2015 | Ando |
| 2015/0261337 | A1 | 9/2015 | Ando et al. |
| 2016/0041694 | A1 | 2/2016 | Ando et al. |
| 2016/0109983 | A1 | 4/2016 | Ando |

FOREIGN PATENT DOCUMENTS

| | | |
|---|---|---|
| JP | 2002-313121 A | 10/2002 |
| JP | 2008-537760 A | 9/2008 |
| JP | 2011-253517 A | 12/2011 |
| WO | WO 2013/021835 A1 | 3/2015 |
| WO | WO 2013/161784 A1 | 12/2015 |
| WO | WO 2014/045847 A1 | 8/2016 |

OTHER PUBLICATIONS

Written Opinion of the International Searching Authority issued for PCT/JP2015/066810, dated Jul. 14, 2015.

* cited by examiner

PLAN VIEW

SIDE VIEW

A-A CROSS SECTION

B-B CROSS SECTION

C-C CROSS SECTION

D-D CROSS SECTION (SECOND DIRECTION)

(FIRST DIRECTION)

(SECOND DIRECTION)

(FIRST DIRECTION)

(SECOND DIRECTION)

(FIRST DIRECTION)

TOUCH PANEL

CROSS REFERENCE TO RELATED APPLICATIONS

The present application is a continuation of International application No. PCT/JP2015/066810, filed Jun. 11, 2015, which claims priority to Japanese Patent Application No. 2014-136714, filed Jul. 2, 2014, the entire contents of each of which are incorporated herein by reference.

FIELD OF THE INVENTION

The present invention relates to a touch panel which detects a pressing operation of an operator with respect to an operation surface.

BACKGROUND OF THE INVENTION

Conventionally, touch panels which each simultaneously detect a touch position and a push amount (pressing force) of a touch when an operator touches an operation surface of a planar shape by a finger or the like have been proposed.

For example, Patent Document 1 discloses a thin touch panel which simultaneously detects a touch position and a push amount by disposing capacitance detection electrodes on at least one of a side of a first principal surface and a side of a second principal surface of a piezoelectric film opposing to each other, and disposing piezoelectric voltage detection electrodes at the side of the first principal surface and the side of the second principal surface of this piezoelectric film. An operation surface is at the side of the first principal surface.

Further, Patent Document 2 discloses a thin touch panel which simultaneously detects a touch position and a push amount by disposing capacitance detection electrodes at a side of a first principal surface and a side of a second principal surface of a dielectric film opposing to each other, disposing piezoelectric voltage detection electrodes at a side of a third principal surface and a side of a fourth principal surface of a piezoelectric film opposing to each other, and overlaying the dielectric film and the piezoelectric film while making the second principal surface and the third principal surface oppose to each other. An operation surface is at the side of the first principal surface.

According to Patent Documents 1 and 2, the piezoelectric films are used which are formed by using uniaxially extended poly-L-lactic acid (PLLA). These piezoelectric films (PLLA films) produce voltages in a film thickness direction when being applied a compressing or stretching force in a direction of 45 degrees with respect to a molecular orientation direction (stretching direction).

Patent Document 1: International Publication No. WO2013/021835
Patent Document 2: International Publication No. WO2014/045847

SUMMARY OF THE INVENTION

However, a sign of charges is reversed when the piezoelectric films (PLLA films) are pulled in a direction (referred to as a vertical direction herein) that is 45 degrees with respect to the stretching direction, and when the piezoelectric films are pulled in another direction (referred to as a horizontal direction herein) that is also 45 degrees with respect to the stretching direction. The vertical direction and the horizontal direction are orthogonal. Hence, when a pressing position of an operator is at a center of a principal surface of the piezoelectric films, distortion amounts of the piezoelectric films in the vertical direction and distortion amounts in the horizontal direction become nearly equal. When the distortion amounts of the piezoelectric films in the vertical direction and the distortion amounts in the horizontal direction become nearly equal, charges produced by the piezoelectric films cancel each other. Therefore, it is not possible to detect voltages corresponding to the distortions of the piezoelectric films. Therefore, it is not possible to appropriately detect a pressing force from a pressing position at which the distortion amounts of the piezoelectric films in the vertical direction and the distortion amounts in the horizontal direction become nearly equal.

Particularly when principal surfaces of a piezoelectric film are square or circular, if a pressing position is on a first line or a second line described below, a distortion amount of the piezoelectric film in the vertical direction and a distortion amount in the horizontal direction become nearly equal. That is, it is not possible to appropriately detect a press when the pressing position is on the first line or the second line.

The first line is a line which is parallel to a stretching direction of the piezoelectric film, and is a line which divides the principal surfaces of this piezoelectric film into two.

The second line is a line which is orthogonal to a stretching direction of the piezoelectric film, and is a line which divides the principal surfaces of this piezoelectric film into two.

An object of the present invention is to provide a touch panel which can appropriately detect an operator's press on an operation surface.

A touch panel according to the present invention is configured as follows to achieve the above object.

This touch panel includes an operation input member, a pressing force detecting sensor and an adhesive layer. The operation input member is a plate member which includes a first principal surface and a second principal surface opposing to each other, and produces a distortion in response to a press on an operation surface which is the first principal surface. This operation input member is formed by using a plate made of glass or polyethylene terephthalate (PET), for example, and, consequently, provide sufficient transmissiveness.

The pressing force detecting sensor includes piezoelectric voltage detection electrodes disposed at both principal surfaces of a piezoelectric film (a side of a third principal surface and a side of a fourth principal surface), where the piezoelectric voltage detection electrode detect piezoelectric voltages corresponding to a distortion amount of a piezoelectric film, and the piezoelectric film has a flat film shape and includes the third principal surface and the fourth principal surface opposing to each other. For example, the piezoelectric film is polylactic acid stretched in at least a uniaxial direction.

The adhesive layer is between the second principal surface of the operation input member and the third principal surface of the piezoelectric film, and pastes the operation input member and the pressing force detecting sensor together. Further, the adhesive layer is divided into a plurality of areas, and includes at least one combination of two areas of different moduli. That is, the adhesive layer is formed to have the uniform modulus in the second principal surface of the operation input member and a plane facing the third principal surface of the piezoelectric film.

A pressing force for pressing the operation surface of the operation input member is transmitted to the piezoelectric film via the adhesive layer. That is, the distortion amount of each principal surface of the piezoelectric film changes according to a distribution of moduli in the adhesive layer. Consequently, irrespectively of an influence of a pressing position on the operation surface of the operation input member, it is possible to avoid that the distortion amounts of the piezoelectric film become equal in two orthogonal directions on each principal surface. Consequently, it is possible to appropriately detect a press of an operator on an operation surface.

Further, the adhesive layer has a modulus distribution which is not line-symmetrical with respect to an axis of symmetry which is a line which is parallel to a stretching direction of the piezoelectric film and a line which divides a plane opposing to the third principal surface of the piezoelectric film into two. Consequently, it is possible to further reliably avoid that the distortion amounts of the piezoelectric film become equal in the two orthogonal directions on each principal surface.

Further, a boundary between two neighboring areas of different moduli in the adhesive layer may be a curve not a line. By so doing, it is possible to lower visibility of the boundary between the two neighboring areas of the different moduli in the adhesive layer. Consequently, it is possible to suppress any strangeness the operators may feel.

Further, a modulus of each of the divided areas of the adhesive layer may be one of a first modulus and a second modulus. That is, the modulus of the adhesive layer may be configured to be non-uniform by a combination of areas of two types of moduli in the second principal surface of the operation input member and a plane opposing to the third principal surface of the piezoelectric film. In this case, to suppress cancellation of charges in a charge distribution produced in the piezoelectric film, it is preferable to make a ratio of a high modulus portion and a low modulus portion twice or more.

Further, the adhesive layer can be formed as an adhesive having a property that a modulus changes according to an ultraviolet ray irradiation amount, a heat ray irradiation amount, a radiation irradiation amount or a microwave irradiation amount.

As for ultraviolet ray irradiation, it is possible to lower the modulus by lowering a molecular weight of polymer used for the adhesive. Further, as for heat ray irradiation, if the adhesive contains thermosetting resin such as epoxy resin, the adhesive thermally cures, so that it is possible to increase the modulus. In addition, as for thermal curing, it is possible to increase the modulus at a higher speed by using dielectric heating caused by microwave irradiation. As for radiation irradiation, a radiation crosslinking effect re-couples molecules, and a molecular weight increases, so that it is possible to enhance the modulus. The modulus can be increased in this way by containing triallyl isocyanurate which provides the radiation crosslinking effect, in the adhesive. The adhesive is obtained by adding a tackifier, a crosslinking agent, a softener or the like to an elastomer which is a base material. Types of the adhesive include a rubber adhesive for which natural rubber is used, an acrylic adhesive for which acrylic polymer is used, a silicone adhesive for which silicone rubber and silicone resin are mixed at a predetermined ratio, and a urethane adhesive. The acrylic adhesive and the silicone adhesive are mainly used for a highly transparent adhesive used for the touch panel.

According to the present invention, it is possible to appropriately detect a press of an operator on an operation surface.

DETAILED DESCRIPTION OF THE PREFERRED EMBODIMENTS OF THE INVENTION

Figure 1:
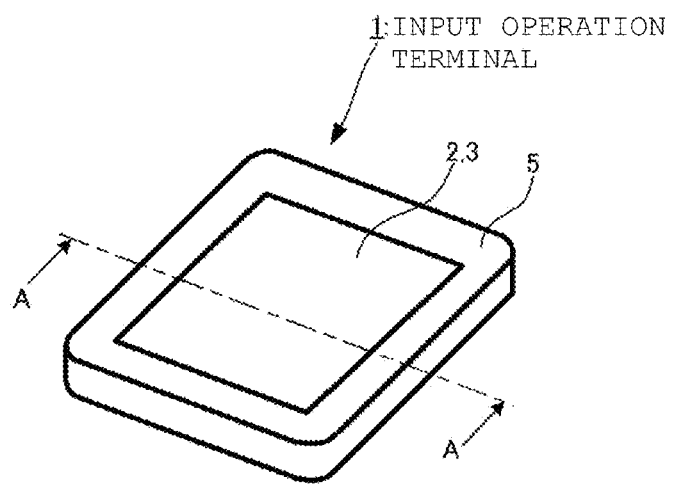
FIG. 1 is a schematic view illustrating an external appearance of an input operation terminal including a touch panel.
Figure 2:
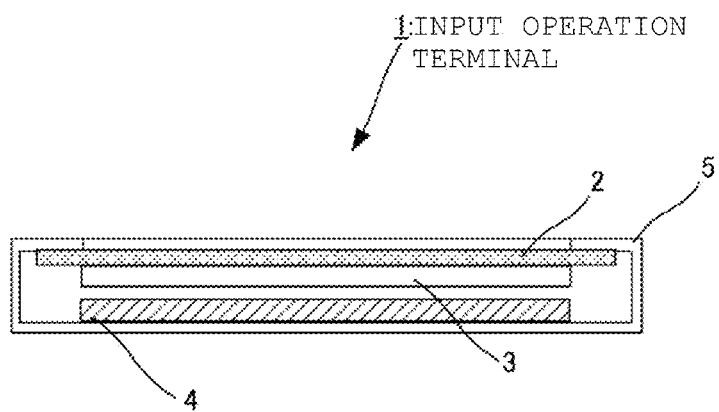
FIG. 2 is a sectional view taken along a direction A-A illustrated in FIG. 1.

A touch panel according to an embodiment of the present invention will be described below. FIG. 1 is a schematic view illustrating an external appearance of an input operation terminal including a touch panel according to the embodiment. FIG. 2 is a sectional view taken along a direction A-A illustrated in FIG. 1. An input operation terminal 1 according to the present embodiment employs a configuration where a touch panel 2, an indicator 3 and a control substrate 4 are attached in a housing 5. The housing 5 has a nearly cuboid shape as illustrated in FIG. 1. The housing 5 has a shape whose upper surface in FIG. 1 includes an opening surface of a rectangular shape. In the present embodiment, this opening surface is nearly square.

The touch panel 2 is attached such that a first principal surface described below blocks the opening surface of the rectangular shape formed in the upper surface of housing 5. That is, the first principal surface is exposed through the opening surface of the housing 5. Further, the indicator 3 is attached in the housing 5. This indicator 3 is attached such that a display surface faces the opening surface formed in the upper surface of the housing 5. That is, the indicator 3 is attached such that the display surface faces a principal surface of the touch panel 2 which blocks the opening surface formed in the upper surface of the housing 5. The display surface of the indicator 3 has a substantially same size as that of the opening surface in the upper surface of the housing 5 (which means that vertical and horizontal lengths are substantially the same). The indicator 3 is attached to the housing 5 such that a center of the display surface and a center of the opening surface in the upper surface of the housing 5 match. An operator can see the display surface of the indicator 3 through the touch panel 2 which blocks the opening surface in the upper surface of the housing 5. Further, the control substrate 4 is attached in the housing 5. On this control substrate 4, a display control circuit which controls images to be displayed on the display surface of the indicator 3, an input operation detection circuit which detects an input operation of the operator, and a processing circuit which executes processing corresponding to the detected input operation of the operator are formed.

Figure 3:
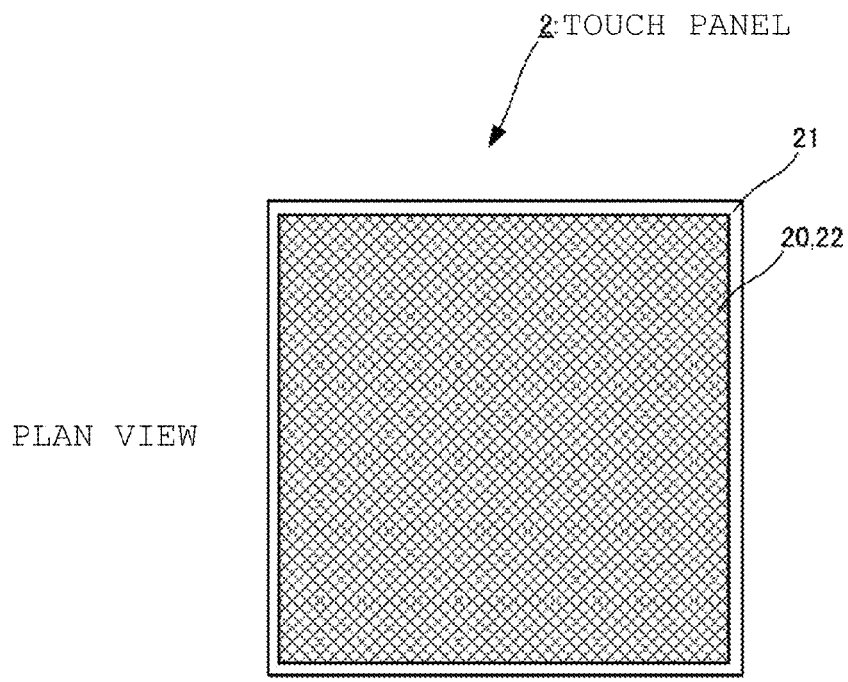
FIG. 3 is a plan view and a side view of the touch panel.
Figure 3:
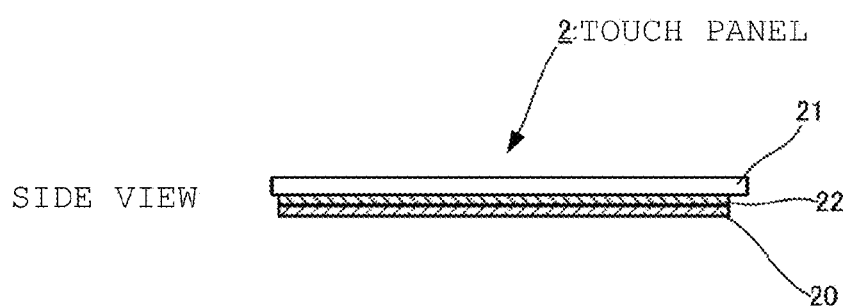

Hereinafter, the touch panel 2 will be described in detail. FIG. 3 is a plan view and a side view of the touch panel. The touch panel 2 according to the present embodiment includes a main functional unit 20, a plate member 21 and an adhesive layer 22.

The plate member 21 includes the first principal surface and a second principal surface opposing to each other. The plate member 21 is made of a material having good permeability and having rigidity to some degree. The plate member 21 is formed by using a flat plate made of glass, polyethylene terephthalate (PET), polycarbonate (PC) or acryl. This plate member 21 corresponds to an operation input member according to the present invention. The first principal surface of the plate member 21 is a surface which is exposed to an outside through the opening surface in the upper surface of the housing 5 in FIG. 1. This first principal surface corresponds to an operation surface according to the present invention.

The adhesive layer 22 is positioned between the second principal surface of the plate member 21 and one principal surface of the main functional unit 20 (the principal surface which is positioned at a side of a third principal surface of a piezoelectric film 200 described below and faces this third principal surface), and pastes the second principal surface of the plate member 21 and the one principal surface of the main functional unit 20 such that the second principal surface and the one principal surface face each other. The other principal surface of the main functional unit 20 (the principal surface which is positioned at a side of a fourth principal surface of the piezoelectric film 200 described below and faces this fourth principal surface) faces a display screen of the indicator 3. Hereinafter, one principal surface of the main functional unit 20 (at the side of the third principal surface of the piezoelectric film 200) will be referred to as a fifth principal surface, and the other principal surface of the main functional unit 20 (the side of the fourth principal surface of the piezoelectric film 200) will be referred to as a sixth principal surface. The fifth principal surface and the sixth principal surface of the main functional unit 20 oppose to each other. Further, as described below, the third principal surface and the fourth principal surface of the piezoelectric film 200 oppose to each other. The adhesive layer 22 having the substantially uniform thickness is formed over the nearly entire fifth principal surface of the main functional unit 20.

This main functional unit 20 employs a configuration corresponding to a pressing force detecting sensor according to the present invention.

Figure 4:
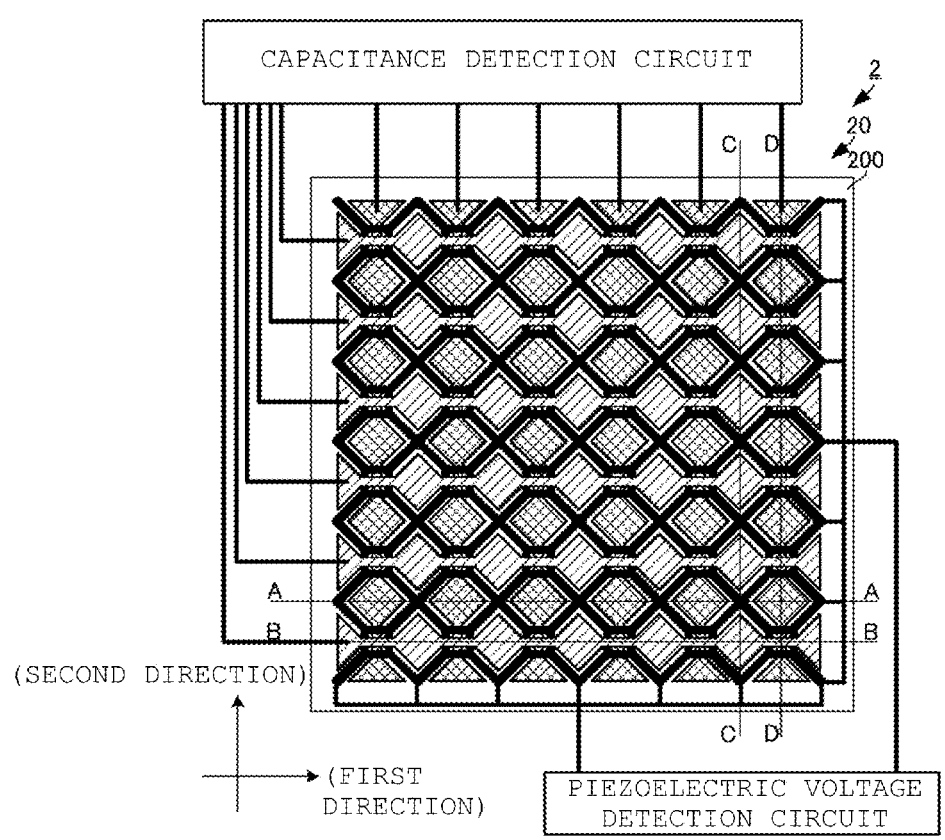
FIG. 4 is a plan view illustrating a main functional unit of the touch panel.
Figure 5:
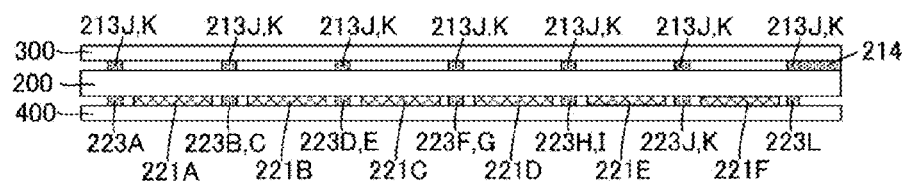
FIG. 5 is an A-A sectional view, a B-B sectional view, a C-C sectional view and a D-D sectional view illustrated in FIG. 3.
Figure 5:
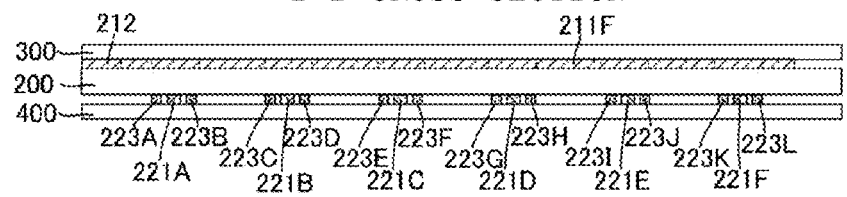
Figure 5:
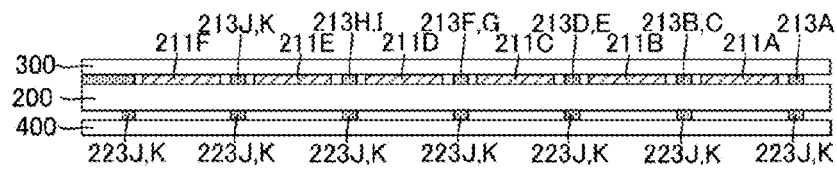
Figure 5:
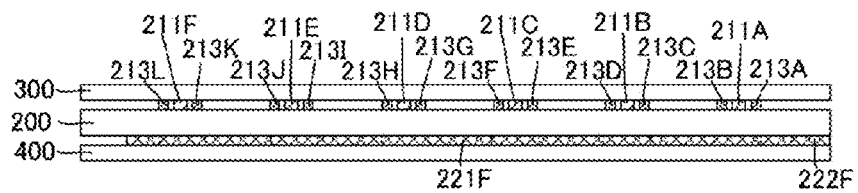
Figure 6:
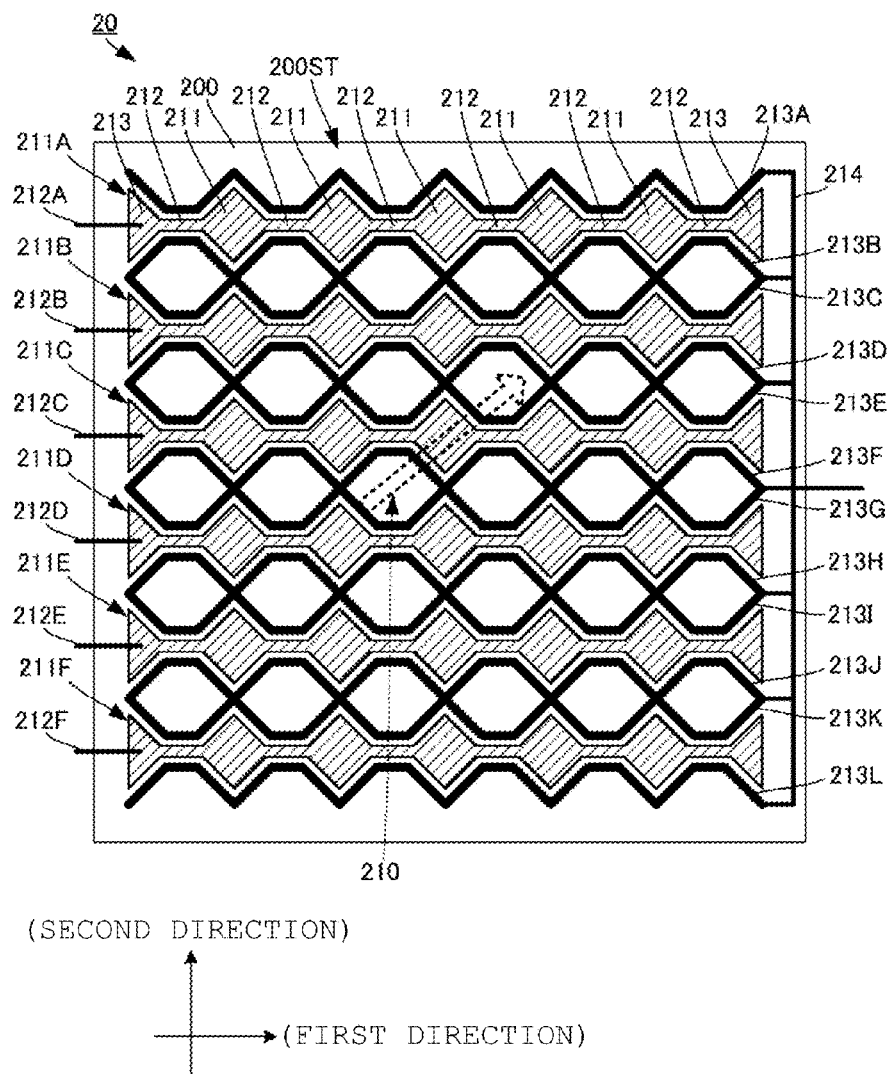
FIG. 6 is a plan view illustrating a side of a third principal surface of a piezoelectric film of the touch panel according to the present embodiment.
Figure 7:
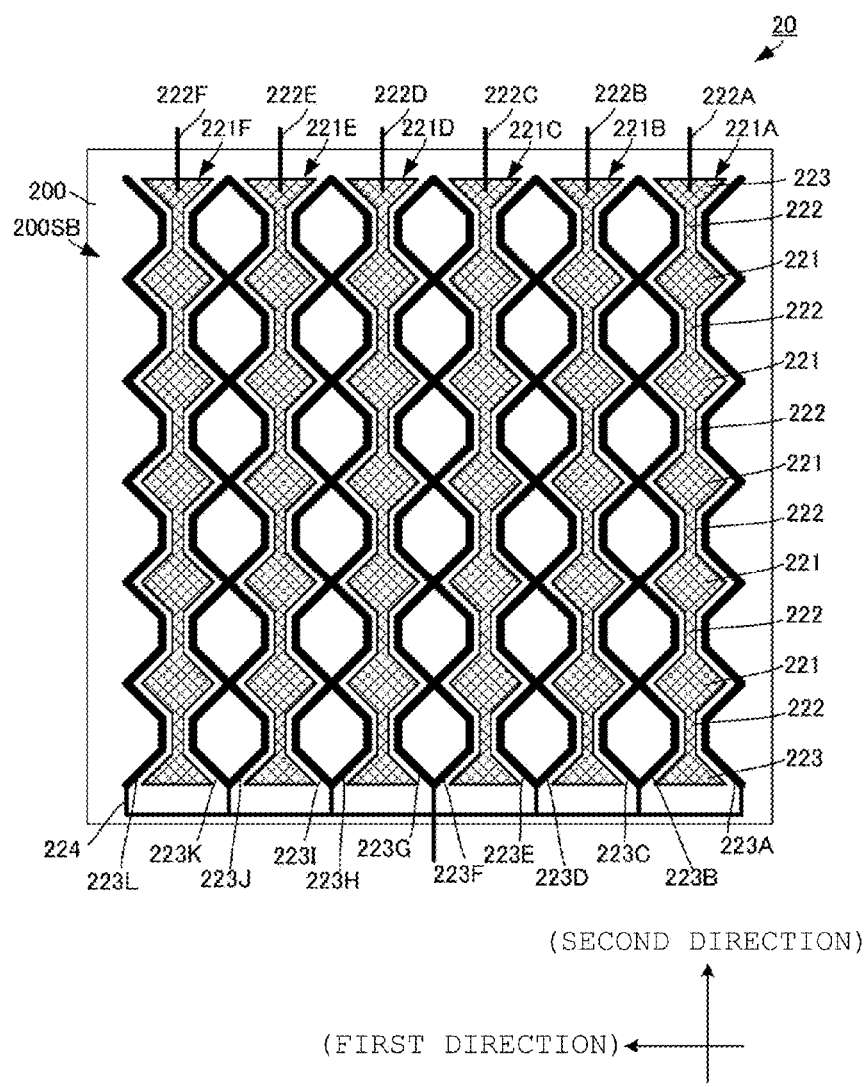
FIG. 7 is a plan view illustrating a side of a fourth principal surface of the piezoelectric film of the touch panel according to the present embodiment.

Hereinafter, the main functional unit 20 will be described. FIG. 4 is a plan view illustrating the main functional unit of the touch panel according to the embodiment. FIG. 5 is an A-A sectional view, a B-B sectional view, a C-C sectional view and a D-D sectional view illustrated in FIG. 4. FIG. 6 is a plan view of the third principal surface of the main functional unit of the touch panel according to the embodiment. FIG. 7 is a plan view of the fourth principal surface of the main functional unit of the touch panel according to the embodiment.

In addition, FIGS. 6 and 7 are views illustrating a third principal surface 200ST and a fourth principal surface 200SB of the piezoelectric film 200 from a side of the fifth principal surface. Further, electrode patterns in FIGS. 4, 5, 6 and 7 are exemplary. The numbers of disposed first capacitance detection sub-electrodes, second capacitance detection sub-electrodes, first piezoelectric voltage detection sub-electrodes and second piezoelectric voltage detection sub-electrodes are not limited to these. These numbers are optionally determined according to a specification of the touch panel 2. Furthermore, an example of the touch panel adopting a composite electrode structure that capacitance detection electrodes and press detection electrodes are disposed in the same layer has been described in the present embodiment. However, the capacitance detection electrodes and press detection electrodes may be completely separated and formed in different layers. In this case, the capacitance detection electrodes may be formed and pasted on another film such as PET or cycloolefin polymer (COP) or may be directly formed on the plate member 21. Electrodes for the piezoelectric film 200 may be directly formed on the both principal surfaces of the piezoelectric film 200 or adopt a structure that electrodes are formed on PET or COP and are pasted by an adhesive. The adhesive layer 22 is not limited to one layer and is formed by using a plurality of layers in each structure described above.

The main functional unit 20 includes the piezoelectric film 200, protection layers 300 and 400, and the piezoelectric voltage detection electrodes and the capacitance detection electrodes formed according to a pattern described below. The above fifth principal surface is a principal surface of the protection layer 300 facing the third principal surface 200ST, and is a principal surface (an upper principal surface in FIG. 5) at a far side of this third principal surface 200ST. Further, the above sixth principal surface is a principal surface of the protection layer 400 facing the fourth principal surface 200SB, and is a principal surface (a lower principal surface in FIG. 5) at a far side of this fourth principal surface 200SB.

The piezoelectric film 200 is a flat film of a rectangular shape including the third principal surface 200ST and the fourth principal surface 200SB opposing to each other. The piezoelectric film 200 is made of uniaxially stretched poly-L-lactic acid (PLLA).

Such PLLA is made of a chiral polymer and has a main chain which adopts a spiral structure. The PLLA has piezoelectricity when the PLLA is uniaxially stretched and molecules are oriented. A piezoelectric constant of the uniaxially stretched PLLA belongs to a group of very high piezoelectric constants among various polymers.

A stretching ratio is preferably approximately 3 to 8 times. By performing heating treatment after performing stretching, crystallization of extended chain crystal of polylactic acid is accelerated, and the piezoelectric constant improves.

In addition, when biaxial stretching is performed, it is possible to provide the same effect as that of uniaxial stretching by employing different stretching ratios for respective axes. When, for example, the film is stretched eight times in a given direction which is an X axis, and the film is stretched twice in a Y axis direction orthogonal to the X axis, it is possible to provide the same effect in terms of the piezoelectric constant as an effect obtained when the film is uniaxially stretched four times in the X axis direction. A simply uniaxially stretched film is likely to break in a stretching axial direction. Consequently, by performing biaxial stretching as described above, it is possible to increase the strength to some degree.

Further, the PLLA exhibits piezoelectricity as a result of molecular orientation treatment by stretching, and does not need to be subjected to poling treatment unlike other polymers such as PVDF or piezoelectric ceramic. That is, the piezoelectricity of the PLLA which does not belong to ferroelectrics is exhibited not by ion polarization as in ferroelectrics such as PVDF or PZT, but derives from a spiral structure which is a characteristic structure of molecules. Hence, the PLLA does not exhibit pyroelectricity produced by other ferroelectric piezoelectric bodies. Further, although PVDF fluctuates in a piezoelectric constant with time and the piezoelectric constant significantly lowers in some cases, a piezoelectric constant of the PLLA is very stable over time.

Furthermore, a relative permittivity of the PLLA is approximately 2.5 and very low. Therefore, when d is a piezoelectric constant and $\varepsilon^T$ is a dielectric constant, a piezoelectric output constant (=piezoelectric g constant where $g=d/\varepsilon^T$ holds) takes a high value.

In this regard, dielectric constant $\varepsilon_{33}{}^T=13\times\varepsilon_0$, the piezoelectric g constant of the PVDF having a piezoelectric constant $d_{31}=25$ pC/N is $g_{31}=0.2172$ Vm/N according to the above equation. Meanwhile, when the piezoelectric g constant of the PLLA having a piezoelectric constant $d_{14}=10$ pC/N is converted into $g_{31}$ and calculated, $d_{14}=2\times d_{31}$ holds. Therefore, $d_{31}=5$ pC/N holds and the piezoelectric g constant takes $g_{31}=0.2258$ Vm/N. Consequently, it is possible to provide the same sufficient push amount detection sensitivity as that of the PVDF by using the PLLA having the piezoelectric constant $d_{14}=10$ pC/N.

Further, as described above, the PLLA has a low dielectric constant unlike general ferroelectrics from which high piezoelectric constants are obtained. Hence, an electric field confinement effect between electrodes formed at a side of the third principal surface 200ST and electrodes formed at a side of the fourth principal surface 200SB is low. Thus, an approach or a contact of a dielectric such as a finger from an outside is likely to change a capacitance. That is, detection sensitivity with response to the change in the capacitance is also high.

A plurality of first capacitance detection sub-electrodes 211A to 211F configuring capacitance detection electrodes, and a plurality of first piezoelectric voltage detection sub-electrodes 213A to 213L configuring piezoelectric voltage detection electrodes are formed on the third principal surface 200ST of the piezoelectric film 200 made of the PLLA having such characteristics in patterns illustrated in FIGS. 4 and 6. For a plurality of first capacitance detection sub-electrodes 211A to 211F and a plurality of first piezoelectric voltage detection sub-electrodes 213A to 213L, ones of organic electrodes whose main components are ITO, ZnO and polythiophene, organic electrodes whose main component is polyaniline, electrodes for which silver nanowires are used and electrodes for which carbon nanotubes are used are preferably used. By using these materials, it is possible to form a highly light-transmissive electrode pattern. These materials are formed by deposition, spattering or plating. In addition, it is also possible to use metal electrodes or electrodes formed by silver paste other than the electrodes made of the above material formed by deposition, spattering or plating when transparency is not necessary.

A plurality of first capacitance detection sub-electrodes 211A to 211F has the same shape. More specifically, for example, the first capacitance detection sub-electrode 211A includes a plurality of wide width portions 211, a plurality of narrow width portions 212 and a pair of wide width end portions 213. Each wide width portion 211 is square. Each wide width portion 211 does not necessarily need to be square at all times, and may have a diamond shape or a parallelogram or may have an arbitrary shape which a detection IC demands. Each narrow width portion 212 has a rectangular shape whose length with respect to a width is long. Each wide width end portion 213 is nearly isosceles triangular. A plurality of wide width portions 211 and a plurality of narrow width portions 212 are connected and alternately aligned in an extension direction of the first capacitance detection sub-electrode 211A. In this regard, each wide width portion 211 is connected to each narrow width portion 212 such that a diagonal line of the square shape and a connection direction with respect to the narrow width portions 212 are parallel. Further, each wide width portion 211 is connected to each narrow width portion 212 via a pair of apex angles which form the diagonal line.

There are the wide width end portions 213 at both ends in the extension direction of the first capacitance detection sub-electrode 211A. Both ends of a continuous electrode pattern including a plurality of wide width portions 211 and a plurality of narrow width portions 212 are connected to the wide width end portions 213 by the narrow width portions 212. In this regard, each wide width end portion 213 is connected to each narrow width portion 212 via the apex angle of the isosceles triangular shape.

A plurality of first capacitance detection sub-electrodes 211A to 211F is formed extending along a first direction on the third principal surface 200ST of the piezoelectric film 200. A plurality of first capacitance detection sub-electrodes 211A to 211F is formed at predetermined intervals along a second direction orthogonal to the first direction on the third principal surface 200ST. In this regard, a plurality of first capacitance detection sub-electrodes 211A to 211F is formed such that each wide width portion 211 is positioned at the same position along the first direction, in other words, such that each wide width portion 211 is aligned along the second direction.

In this regard, the first direction and the second direction are set to directions which form an angle of approximately 45° with respect to a uniaxial stretching direction 210 of the piezoelectric film 200. Approximately 45° means an angle including, for example, 45°±10°. These angles are design matters to be appropriately determined according to an entire design such as bend detection precision based on use of a displacement sensor.

A plurality of first piezoelectric voltage detection sub-electrodes 213A to 213L is formed along outer shapes of a plurality of first capacitance detection sub-electrodes 211A to 211F, and apart from a plurality of first capacitance detection sub-electrodes 211A to 211F.

More specifically, the first piezoelectric voltage detection sub-electrode 213A is formed along the outer shape of the first capacitance detection sub-electrode 211A at an opposite side to the first capacitance detection sub-electrode 211B, and apart from the first capacitance detection sub-electrode 211A.

The first piezoelectric voltage detection sub-electrode 213B is formed along the outer shape of the first capacitance detection sub-electrode 211A at a side of the first capacitance detection sub-electrode 211B, and apart from the first capacitance detection sub-electrode 211A. The first piezoelectric voltage detection sub-electrode 213C is formed along the outer shape of the first capacitance detection sub-electrode 211B at a side of the first capacitance detection sub-electrode 211A, and apart from the first capacitance detection sub-electrode 211B. The first piezoelectric voltage detection sub-electrodes 213B and 213C are connected with each other near corner portions of the wide width portion 211 and the wide width end portion 213 of the first capacitance detection sub-electrode.

The first piezoelectric voltage detection sub-electrode 213D is formed along the outer shape of the first capacitance detection sub-electrode 211B at a side of the first capacitance detection sub-electrode 211C, and apart from the first capacitance detection sub-electrode 211B. The first piezoelectric voltage detection sub-electrode 213E is formed along the outer shape of the first capacitance detection sub-electrode 211C at a side of the first capacitance detection sub-electrode 211B, and apart from the first capacitance detection sub-electrode 211C. The first piezoelectric voltage detection sub-electrodes 213D and 213E are connected with each other near corner portions of the wide width portion 211 and the wide width end portion 213 of the first capacitance detection sub-electrode.

The first piezoelectric voltage detection sub-electrode 213F is formed along the outer shape of the first capacitance detection sub-electrode 211C at a side of the first capacitance detection sub-electrode 211D, and apart from the first capacitance detection sub-electrode 211C. The first piezoelectric voltage detection sub-electrode 213G is formed along the outer shape of the first capacitance detection sub-electrode 211D at a side of the first capacitance detection sub-electrode 211C, and apart from the first capacitance detection sub-electrode 211D. The first piezoelectric voltage detection sub-electrodes 213F and 213G are connected with each other near corner portions of the wide width portion 211 and the wide width end portion 213 of the first capacitance detection sub-electrode.

The first piezoelectric voltage detection sub-electrode 213H is formed along the outer shape of the first capacitance detection sub-electrode 211D at a side of the first capacitance detection sub-electrode 211E, and apart from the first capacitance detection sub-electrode 211D. The first piezoelectric voltage detection sub-electrode 213I is formed along the outer shape of the first capacitance detection sub-electrode 211E at a side of the first capacitance detection sub-electrode 211D, and apart from the first capacitance detection sub-electrode 211E. The first piezoelectric voltage detection sub-electrodes 213H and 213I are connected with each other near corner portions of the wide width portion 211 and the wide width end portion 213 of the first capacitance detection sub-electrode.

The first piezoelectric voltage detection sub-electrode 213J is formed along the outer shape of the first capacitance detection sub-electrode 211E at a side of the first capacitance detection sub-electrode 211F, and apart from the first capacitance detection sub-electrode 211E. The first piezoelectric voltage detection sub-electrode 213K is formed along the outer shape of the first capacitance detection sub-electrode 211F at a side of the first capacitance detection sub-electrode 211E, and apart from the first capacitance detection sub-electrode 211F. The first piezoelectric voltage detection sub-electrodes 213J and 213K are connected with each other near corner portions of the wide width portion 211 and the wide width end portion 213 of the first capacitance detection sub-electrode.

The first piezoelectric voltage detection sub-electrode 213L is formed along the outer shape of the first capacitance detection sub-electrode 211F at a side opposite to the first capacitance detection sub-electrode 211E, and apart from the first capacitance detection sub-electrode 211F.

The first piezoelectric voltage detection sub-electrodes 213A to 213L are bundled by a lead-around electrode 214, and are connected to an external circuit. The first capacitance detection sub-electrodes 211A to 211F are individually connected to lead-around electrodes 212A to 212F, respectively, and are connected to the external circuit with the lead-around electrodes 212A to 212F interposed therebetween. These lead-around electrodes 212A to 212F and 214 are formed at an outer side of a formation area of the first capacitance detection sub-electrodes 211A to 211F and the first piezoelectric voltage detection sub-electrodes 213A to 213L. Further, the lead-around electrodes 212A to 212F are formed at one end in the first direction, and the lead-around electrode 214 is formed at the other end in the first direction.

Furthermore, at the side of the fourth principal surface 200SB of the piezoelectric film 200, a plurality of second capacitance detection sub-electrodes 221A, 221B, 221C, 221D, 221E and 221F configuring capacitance detection electrodes, and a plurality of second piezoelectric voltage detection sub-electrodes 223A, 223B, 223C, 223D, 223E, 223F, 223G, 223H, 2223I, 223J, 223K and 223L configuring piezoelectric voltage detection electrodes are formed in the patterns illustrated in FIGS. 4 and 7. For a plurality of second capacitance detection sub-electrodes 221A to 221F and a plurality of second piezoelectric voltage detection sub-electrodes 223A to 223L, too, ones of organic electrodes whose main components are ITO, ZnO and polythiophene, organic electrodes whose main component is polyaniline, electrodes for which silver nanowires are used and electrodes for which carbon nanotubes are used are preferably used. By using these materials, it is possible to form a highly light-transmissive electrode pattern. In addition, it is also possible to use electrodes formed by silver paste or metal electrodes formed by deposition, spattering or plating when transparency is not necessary.

A plurality of second capacitance detection sub-electrodes 221A to 221F has the same shape. More specifically, for example, the second capacitance detection sub-electrode 221A includes a plurality of wide width portions 221, a plurality of narrow width portions 222 and a pair of wide width end portions 223. Each wide width portion 221 is square. Each wide width portion 221 does not necessarily need to be square, may have a diamond shape or a parallelogram or may have an arbitrary shape which a detection IC demands. Each narrow width portion 222 has a rectangular shape whose length is long compared to the width. Each wide width end portion 223 is nearly isosceles triangular. A plurality of wide width portions 221 and a plurality of narrow width portions 222 are connected and alternately aligned in an extension direction of the second capacitance detection sub-electrode 221A. In this regard, each wide width portion 221 is connected to each narrow width portion 222 such that a diagonal line of the square shape and a connection direction with respect to the narrow width portions 222 are parallel. Further, each wide width portion 221 is connected to each narrow width portion 222 via a pair of apex angles which form the diagonal line.

There are the wide width end portions 223 at both ends in a stretching direction of the second capacitance detection sub-electrode 221A. Both ends of a continuous electrode pattern including a plurality of wide width portions 221 and a plurality of narrow width portions 222 are connected to the wide width end portions 223 by the narrow width portions 222. In this regard, each wide width end portion 223 is connected to each narrow width portion 222 via the apex angle of the isosceles triangular shape.

A plurality of second capacitance detection sub-electrodes 221A to 221F is formed extending along the second direction on the fourth principal surface 200SB of the piezoelectric film 200. A plurality of second capacitance detection sub-electrodes 221A to 221F is formed at predetermined intervals along the first direction orthogonal to the second direction on the fourth principal surface 200SB. In this regard, a plurality of second capacitance detection sub-electrodes 221A to 221F is formed such that each wide width portion 221 is positioned at the same position along the second direction, in other words, such that each wide width portion 221 is aligned along the first direction.

Further, a plurality of second capacitance detection sub-electrodes 221A to 221F is formed such that each wide width portion 223 does not oppose to wide width portions 211 of the first capacitance detection sub-electrodes 211A to 211F with the piezoelectric film 200 interposed therebetween. In other words, when seen from the side of the third principal surface 200ST, the second capacitance detection sub-electrodes 221A to 221F are formed such that the wide width portions 223 configuring a plurality of second capacitance detection sub-electrodes 221A to 221F do not overlap the wide width portions 211 configuring the first capacitance detection sub-electrodes 211A to 211F. To put it in still another way, only the narrow width portions 212 and 222 of a plurality of first capacitance detection sub-electrodes 211A to 211F and a plurality of second capacitance detection sub-electrodes 221A to 221F oppose to each other with the piezoelectric film 200 interposed therebetween.

Further, when seen from the side of the third principal surface 200ST, the first capacitance detection sub-electrodes 211A to 211F and the second capacitance detection sub-electrodes 221A to 221F are formed such that there are gaps of predetermined widths between the wide width portions 221 configuring a plurality of second capacitance detection sub-electrodes 221A to 221F and the wide width portions 211 configuring the first capacitance detection sub-electrodes 211A to 211F. Furthermore, the widths of the gaps are set such that the first piezoelectric voltage detection sub-electrode 213A to 213K formed on the above third principal surface 200ST are housed in the gaps when seen from the side of the third principal surface 200ST.

A plurality of second piezoelectric voltage detection sub-electrodes 223A to 223L is formed along outer shapes of a plurality of second capacitance detection sub-electrodes 221A to 221F, and apart from a plurality of second capacitance detection sub-electrodes 221A to 221F.

More specifically, the second piezoelectric voltage detection sub-electrode 223A is formed along the outer shape of the second capacitance detection sub-electrode 221A at an opposite side to the second capacitance detection sub-electrode 221B, and apart from the second capacitance detection sub-electrode 221A.

The second piezoelectric voltage detection sub-electrode 223B is formed along the outer shape of the second capacitance detection sub-electrode 221A at a side of the second capacitance detection sub-electrode 221B, and apart from the second capacitance detection sub-electrode 221A. The second piezoelectric voltage detection sub-electrode 223C is formed along the outer shape of the second capacitance detection sub-electrode 221B at a side of the second capacitance detection sub-electrode 221A, and apart from the second capacitance detection sub-electrode 221B. The second piezoelectric voltage detection sub-electrodes 223B and 223C are connected with each other near corner portions of the wide width portion 221 and the wide width end portion 223 of the second capacitance detection sub-electrode.

The second piezoelectric voltage detection sub-electrode 223D is formed along the outer shape of the second capacitance detection sub-electrode 221B at a side of the second capacitance detection sub-electrode 221C, and apart from the second capacitance detection sub-electrode 221B. The second piezoelectric voltage detection sub-electrode 223E is formed along the outer shape of the second capacitance detection sub-electrode 221C at a side of the second capacitance detection sub-electrode 221B, and apart from the second capacitance detection sub-electrode 221C. The second piezoelectric voltage detection sub-electrodes 223D and 223E are connected with each other near corner portions of the wide width portion 221 and the wide width end portion 223 of the second capacitance detection sub-electrode.

The second piezoelectric voltage detection sub-electrode 223F is formed along the outer shape of the second capacitance detection sub-electrode 221C at a side of the second capacitance detection sub-electrode 221D, and apart from the second capacitance detection sub-electrode 221C. The second piezoelectric voltage detection sub-electrode 223G is formed along the outer shape of the second capacitance detection sub-electrode 221D at a side of the second capacitance detection sub-electrode 221C, and apart from the second capacitance detection sub-electrode 221D. The second piezoelectric voltage detection sub-electrodes 223F and 223G are connected with each other near corner portions of the wide width portion 221 and the wide width end portion 223 of the second capacitance detection sub-electrode.

The second piezoelectric voltage detection sub-electrode 223H is formed along the outer shape of the second capacitance detection sub-electrode 221D at a side of the second capacitance detection sub-electrode 221E, and apart from the second capacitance detection sub-electrode 221D. The second piezoelectric voltage detection sub-electrode 223I is formed along the outer shape of the second capacitance detection sub-electrode 221E at a side of the second capacitance detection sub-electrode 221D, and apart from the second capacitance detection sub-electrode 221E. The second piezoelectric voltage detection sub-electrodes 223H and 223I are connected with each other near corner portions of the wide width portion 221 and the wide width end portion 223 of the second capacitance detection sub-electrode.

The second piezoelectric voltage detection sub-electrode 223J is formed along the outer shape of the second capacitance detection sub-electrode 221E at a side of the second capacitance detection sub-electrode 221F, and apart from the second capacitance detection sub-electrode 221E. The second piezoelectric voltage detection sub-electrode 223K is formed along the outer shape of the second capacitance detection sub-electrode 221F at a side of the second capacitance detection sub-electrode 221E, and apart from the second capacitance detection sub-electrode 221F. The second piezoelectric voltage detection sub-electrodes 223J and 223K are connected with each other near corner portions of the wide width portion 221 and the wide width end portion 223 of the second capacitance detection sub-electrode.

The second piezoelectric voltage detection sub-electrode 223L is formed along the outer shape of the second capacitance detection sub-electrode 221F at a side opposite to the second capacitance detection sub-electrode 221E, and apart from the second capacitance detection sub-electrode 221F.

Further, the second piezoelectric voltage detection sub-electrodes 223A to 223L formed at the side of the fourth principal surface 200SB and the first piezoelectric voltage detection sub-electrodes 213A to 213K formed at the side of the third principal surface 200ST are formed opposing to each other with the piezoelectric film 200 interposed therebetween in the nearly entire gaps between the wide width portions 221 and 223 and the wide width portions 211 and 213 when seen from the side of the third principal surface 200ST.

For example, as illustrated in FIG. 4, the second piezoelectric voltage detection sub-electrode 223A opposes to the first piezoelectric voltage detection sub-electrode 213A between the wide width end portion 223 of the second capacitance detection sub-electrode 221A and wide width end portion 213 of the first capacitance detection sub-electrode 211A. Further, the second piezoelectric voltage detection sub-electrode 223A opposes to the first piezoelectric voltage detection sub-electrodes 213B and 213C between the wide width portion 221 of the second capacitance detection sub-electrode 221A and wide width end portions 213 of the first capacitance detection sub-electrode 211A and 211B.

In addition, as illustrated in FIG. 4, the other electrodes of the second piezoelectric voltage detection sub-electrode 223A oppose to the first piezoelectric voltage detection sub-electrodes 213D to 213L likewise, and the other second piezoelectric voltage detection sub-electrodes 223B to 223L also oppose to the first piezoelectric voltage detection sub-electrode 213A to 213L.

The second piezoelectric voltage detection sub-electrodes 223A to 223L are bundled by a lead-around electrode 224, and are connected to the external circuit. The second capacitance detection sub-electrodes 221A to 221F are individually connected to lead-around electrodes 222A to 222F, respectively, and are connected to the external circuit with the lead-around electrodes 222A to 222F interposed therebetween. These lead-around electrodes 222A to 222F and 224 are formed at an outer side of a formation area of the second capacitance detection sub-electrodes 221A to 221F and the second piezoelectric voltage detection sub-electrodes 223A to 223L. Further, the lead-around electrodes 222A to 222F are formed at one end in the second direction, and the lead-around electrode 224 is formed at the other end in the second direction.

Thus, the piezoelectric film 200 on which the first capacitance detection sub-electrodes 211A to 211F, the first piezoelectric voltage detection sub-electrodes 213A to 213L, the second capacitance detection sub-electrodes 221A to 221F and the second piezoelectric voltage detection sub-electrodes 223A to 223L are formed configures the main functional unit 20 of the touch panel 2.

At the side of the third principal surface 200ST of the piezoelectric film 200 in the main functional unit 20, the protection layer 300 is disposed to cover the entire surface of an electrode pattern formation area of the first capacitance detection sub-electrodes 211A to 211F and the first piezoelectric voltage detection sub-electrodes 213A to 213L. The protection layer 300 is made of a material having an insulation property and having light-transmissiveness. In addition, when the light-transmissiveness is not necessary, the material is not limited in particular as long as the material has the insulation property.

At the side of the fourth principal surface 200SB of the piezoelectric film 200 in the main functional unit 20, the protection layer 400 is disposed to cover the entire surface of an electrode pattern formation area of the second capacitance detection sub-electrodes 221A to 221F and the second piezoelectric voltage detection sub-electrodes 223A to 223L. The protection layer 400 is also made of a material having an insulation property and having light-transmissiveness similar to the protection layer 300. In addition, when the light-transmissiveness is not necessary, the material is not limited in particular as long as the material has the insulation property.

Further, for the protection layers 300 and 400, PET, polyethylene naphthalate (PEN) or polypropylene (PP) needs to be used, and the protection layers 300 and 400 need to be formed in shapes (thicknesses and the like) which do not hinder a curve of the piezoelectric film 200.

Figure 8:
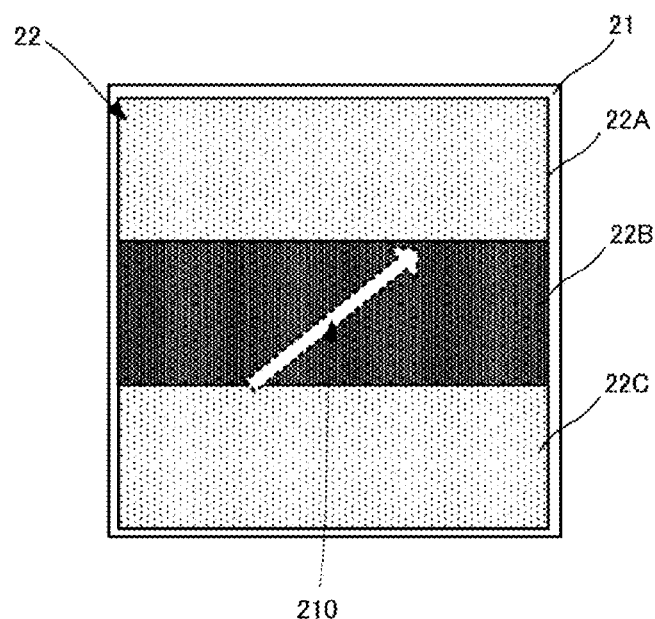
FIG. 8 is a view illustrating a modulus distribution in an adhesive layer of the touch panel according to the present embodiment.

Hereinafter, the adhesive layer 22 positioned between the second principal surface of the plate member 21 and the side of the third principal surface of the piezoelectric film 200 in the main functional unit 20 and pasting the second principal surface of the plate member 21 and the fifth principal surface of the main functional unit 20 opposing to each other will be described. In the present embodiment, as illustrated in FIG. 8, the adhesive layer 22 is divided into three areas 22A, 22B and 22C. The three areas 22A, 22B and 22C are aligned in the second direction. That is, a direction in which the three areas 22A, 22B and 22C are aligned is at approximately 45 degrees with respect to the stretching direction 210 of the piezoelectric film 200. The adhesive layer 22 having the substantially uniform thickness is formed over a nearly entire surface at the side of the fifth principal surface of the main functional unit 20. In the present embodiment, moduli of the areas 22A and 22C positioned on both sides of the area 22B are substantially the same. A modulus of the area 22B is higher than the moduli of the areas 22A and 22C. In other words, the moduli of the areas 22A and 22C are lower than the modulus of the area 22B.

Detection of a touch position and a push amount performed by this touch panel 2 will be described. Capacitance detection lead-around electrodes 212A to 212F and 222A to 222F are connected to a capacitance detection circuit. The piezoelectric voltage detection lead-around electrodes 214 and 224 are connected to a piezoelectric voltage detection circuit. In addition, the capacitance detection circuit and the piezoelectric voltage detection circuit are formed on the control substrate 4.

First, a touch position is detected according to the following principal. In addition, a configuration according to the present embodiment uses a touch position detection concept according to a so-called projection mutual capacitance method, and therefore the detailed detection concept will not be described. Hence, the touch position detection concept will be schematically described below.

Drive signals are applied between the first capacitance detection sub-electrodes 211A to 211F and the second capacitance detection sub-electrodes 221A to 221F via the lead-around electrodes 212A to 212F and the lead-around electrodes 222A to 222F.

In such a state, when the operator touches an arbitrary position (touch position) of the plate member 21 by the finger, part of an electric field at the touch position is induced toward the finger. Thus, a capacitance changes at the touch position compared to a case where there is no touch of the finger. Consequently, it is possible to detect a touch of a finger by detecting such a change in a capacitance by the capacitance detection circuit.

In this regard, as described above, the first capacitance detection sub-electrodes 211A to 211F are disposed at predetermined intervals along the second direction while forming a shape extending in the first direction. Further, the second capacitance detection sub-electrodes 221A to 221F are disposed at the predetermined intervals along the first direction while forming a shape extending in the second direction. Positions at which the first capacitance detection sub-electrodes 211A to 211F and the second capacitance detection sub-electrodes 221A to 221F oppose to each other with the piezoelectric film 200 interposed therebetween, in other words, positions at which an electric field is produced and a detection electric current is applied can be detected as a two-dimensional coordinate based on a combination of each first capacitance detection sub-electrode and each second capacitance detection sub-electrode configuring the opposing positions. When, for example, the operator touches a proximity of the opposing position of the first capacitance detection sub-electrode 211C and the second capacitance detection sub-electrode 221D, near this opposing position, the electric field changes, and a current flowing from the first capacitance detection sub-electrode 211C via the second capacitance detection sub-electrode 221D changes. In this case, the electric field does not change at other opposing portions, and therefore the current does not change, either. By using this principle, it is possible to detect the touch position.

Further, the first capacitance detection sub-electrodes 211A to 211F and the second capacitance detection sub-electrodes 221A to 221F according to the present embodiment are disposed such that the narrow width portions 212 and 222 oppose to each other and the wide width portions 211 and 221 do not overlap when seen from a direction orthogonal to the first principal surface of the plate member 21 which is the operation surface. Consequently, a change in the electric field caused by the touch of the finger is likely to occur in both of the first capacitance detection sub-electrodes 211A to 211F and the second capacitance detection sub-electrodes 221A to 221F. Consequently, it is possible to improve touch detection sensitivity.

Further, in the present embodiment, the piezoelectric film 200 is made of the PLLA, and therefore has a low dielectric constant for forming a capacitance and is likely to be influenced from an outside. Consequently, a change in an electric field caused by a touch of the finger is likely to occur, and it is possible to further improve the touch detection sensitivity.

Next, a push amount detection concept will be described. FIG. 9 is a view for explaining a push amount detecting function of the touch panel according to the present embodiment.

Figure 9A:
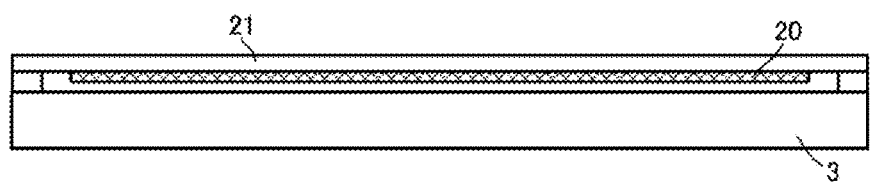
FIGS. 9(A) and 9(B) are views for explaining a press detecting operation of the touch panel according to the present embodiment.

As illustrated in FIG. 9(A), in a state where a pushing force is not applied to the touch panel 2, the plate member 21 is not bent, and a stress is not applied to the main functional unit 20 (piezoelectric film 200), and therefore an electric charge is not produced.

Figure 9B:
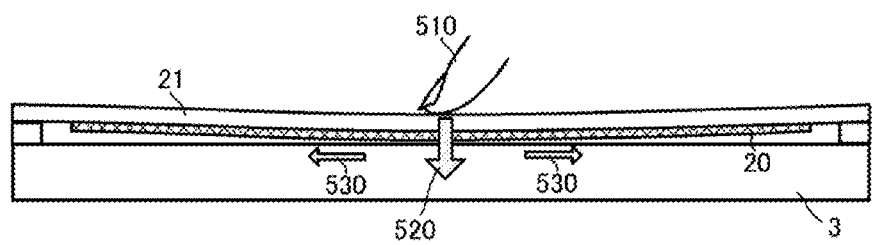

As illustrated in FIG. 9(B), when a finger 510 pushes a surface of the plate member 21, a pressing force as indicated by a bold arrow 520 is applied to the plate member 21. In this case, the plate member 21 is curved bulging toward a side of a surface at which the main functional unit 20 is disposed. Thus, the piezoelectric film 200 of the main functional unit 20 is stretched almost along the first direction, and tensile stresses indicated by bold arrows 530 are produced. These stresses polarize the piezoelectric film 200 into the third principal surface 200ST and the fourth principal surface 200SB.

In this regard, as described above, the first piezoelectric voltage detection sub-electrodes 213A to 213L are formed on the third principal surface 200ST, and the second piezoelectric voltage detection sub-electrodes 223A to 223L are formed on the fourth principal surface 200SB. Therefore, a potential difference is produced between the first piezoelectric voltage detection sub-electrodes 213A to 213L and the second piezoelectric voltage detection sub-electrodes 223A to 223L. Consequently, by detecting this potential difference, i.e., detecting a piezoelectric voltage, it is possible to detect a press of the finger, in other words, a push caused by the touch of the finger.

Further, the PLLA linearly changes a detected voltage (piezoelectric voltage) when the film is stretched according to a push amount. Consequently, it is possible to detect the push amount by measuring a detected voltage value by the piezoelectric voltage detection circuit. That is, it is possible to accurately detect whether the operator has lightly touched or strongly pushed the operation surface. In addition, the detected voltage of the piezoelectric film 200 is normally produced at an instant at which a stress is produced, and a detected voltage value also rapidly lowers as a piezoelectric effect causes leakage of charges. However, it is possible to maintain the detected voltage value for a predetermined period of time by using a detection circuit having a high input impedance or an integration circuit for a push amount detection circuit. Consequently, it is possible to more reliably measure the detected voltage value and detect the push amount. It is possible to provide the same effect by integrating signals like software instead of the above-described detection circuit having a high input impedance or the integration circuit.

As described above, by using the configuration according to the present embodiment, and by just forming capacitance detection electrodes and piezoelectric voltage detection electrodes on both surfaces of one piezoelectric film 200 opposing to each other, it is possible to simultaneously detect a touch position and a push amount (pressing force). Further, it is possible to realize a highly light-transmissive touch panel.

Furthermore, by using the PLLA as a material for the piezoelectric film 200, there is no influence of pyroelectricity. Consequently, it is possible to obtain a detected voltage corresponding to only a push amount without depending on a temperature of a detection position during detection. That is, it is possible to more accurately detect the push amount. Further, the PLLA is polymer and has flexibility and, consequently, is not damaged by a significant displacement unlike piezoelectric ceramics. Consequently, it is possible to more reliably detect a displacement amount even when the displacement amount is larger.

In this regard, an effect obtained by differing the moduli of the area 22B, and the areas 22A and 22C without making the modulus of the adhesive layer 22 uniform will be described. Hereinafter, the effect will be described assuming that the third principal surface and the fourth principal surface of the piezoelectric film 200 are square. Further, the stretching direction of the piezoelectric film 200 is one diagonal line direction, and a direction in which the areas 22A, 22B and 22C are aligned is a direction of 45 degrees with respect to the stretching direction of the piezoelectric film 200.

In this regard, the modulus of the piezoelectric film 200 is uniform.

When the modulus of the adhesive layer 22 is nearly uniform over the entire surface, and when a pressing position is a position on the diagonal line, the piezoelectric film 200 has a nearly uniform positive charge amount and negative charge amount to be produced. This is because a distortion around the pressing position and in the vertical direction of the piezoelectric film 200, and a distortion around the pressing position and in the horizontal direction of the piezoelectric film 200 substantially match. In this case, the charges produced by the distortions of the piezoelectric film 200 are cancelled, and therefore it is not possible to detect the pressing force.

Meanwhile, as illustrated in FIG. 8, when the modulus is not made uniform in the adhesive layer 22 and is differed between the areas 22B and the areas 22A and 22C, a distortion of the plate member 21 is transmitted to the piezoelectric film 200 via the adhesive layer 22. Consequently, by making the modulus of the adhesive layer 22 not uniform, it is possible to make the modulus of the piezoelectric film 200 not substantially uniform. Consequently, even when a pressing position is a position on the diagonal line of the piezoelectric film 200, it is possible to avoid that the amount of a distortion around the pressing position and in the vertical direction of the piezoelectric film 200, and the amount of a distortion around the pressing position and in the horizontal direction of the piezoelectric film 200 substantially match. Consequently, even when the pressing position is the position on the diagonal line, it is possible to prevent charges produced by the distortion of the piezoelectric film 200 from being cancelled and appropriately detect a pressing force. More specifically, a modulus distribution in the adhesive layer 22 is formed as a distribution which is not line-symmetrical with respect to the axis of symmetry which is a line which is parallel to the stretching direction of the piezoelectric film 200 (one diagonal line of the piezoelectric film 200 in the above example) and which is a line which divides a plane opposing to the third principal surface of the piezoelectric film 200 into two. Consequently, it is possible to prevent charges produced by the distortion of the piezoelectric film 200 from being cancelled.

Further, when the touch panel 2 adopts the above structure that the electrodes formed on the PET or the COP are pasted on the both principal surfaces of the piezoelectric film 200 by an adhesive, and a plurality of adhesive layers is used between the piezoelectric film 200 and the plate member 21, it is the most preferable to perform this treatment on the adhesive layer 22 used to adhere the plate member 21 and the main functional unit 20. In addition, this treatment is effective for any adhesive layer between the piezoelectric film 200 and the plate member 21, and it is possible to enhance an effect by performing the same treatment on a plurality of adhesive layers.

Figure 10A:
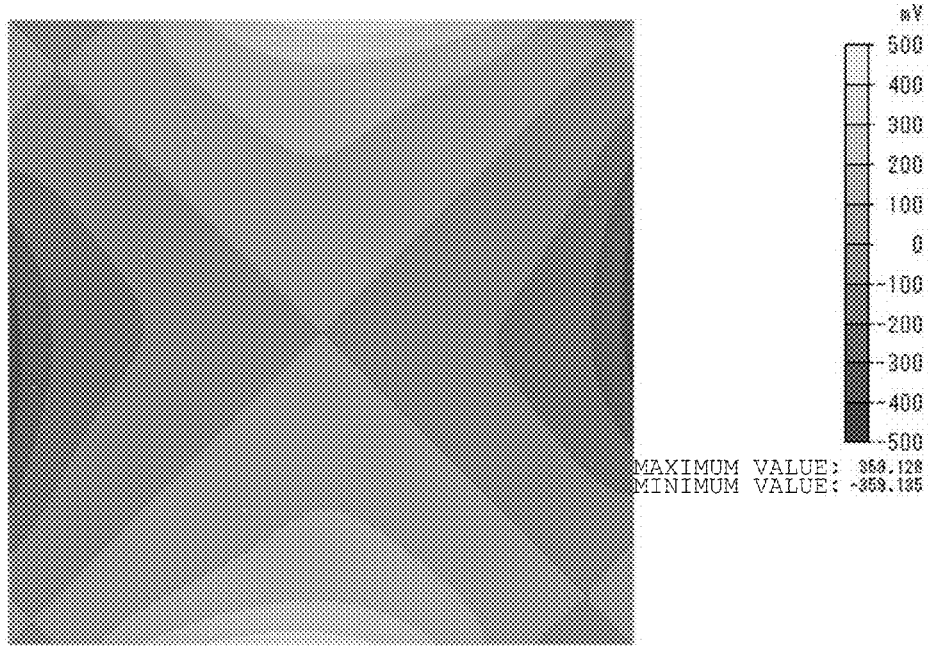
FIGS. 10(A) and 10(B) are views illustrating simulation results of potential distributions produced in the piezoelectric film.
Figure 10B:
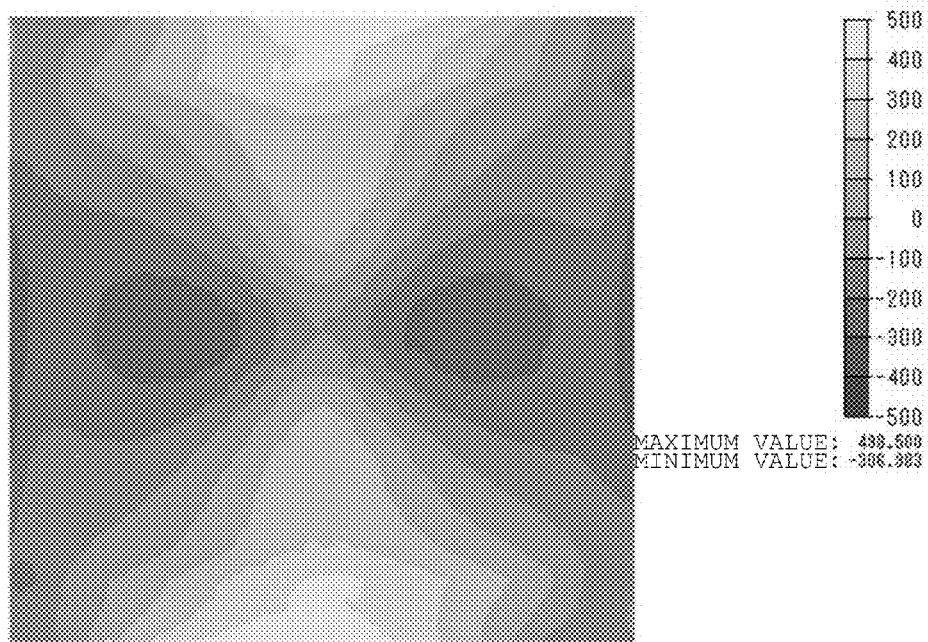

FIG. 10(A) is a view illustrating a result obtained by simulating a potential distribution produced in the piezoelectric film 200 according to a finite element method in case where the modulus of the adhesive layer 22 is made uniform over the nearly entire surface when a pressing force is applied to the center of this plate member 21 in a state where all sides of the plate member 21 are fixed to the housing. Further, FIG. 10(B) is a view illustrating a result obtained by simulating a potential distribution produced in the piezoelectric film 200 according to the finite element method in case where the modulus of the adhesive layer 22 is differed between areas as illustrated in FIG. 8 when the pressing force is applied to the center of this plate member 21 in the state where all sides of the plate member 21 are fixed to the housing. FIG. 10 illustrates simulations performed when a pressing position is at the center of the principal surface (the center of the piezoelectric film 200) of the plate member 21. In this regard, according to the finite element method simulation, calculation is performed without forming electrodes, and potentials on a material surface are calculated by a piezoelectric equation. A potential of each computing element is associated with an electric field based on internal polarization, and therefore this potential distribution substantially matches with a charge distribution.

As illustrated in FIG. 10(A), when the modulus of the adhesive layer 22 is uniform, a positive potential level and a negative potential level are equal, and the areas of respective areas are equal. When the electrodes are formed on the principal surfaces of the piezoelectric film 200, charges corresponding to produced voltages appear on the electrodes. However, substantially equivalent positive charges and negative charges are produced on electrode planes, and the charges nearly completely cancel each other. That is, a potential to be detected is approximately 0, and therefore it is not possible to obtain a press detection signal. Meanwhile, as illustrated in FIG. 10(B), there are areas of different moduli in the adhesive layer 22, a balance between a vertical component and a horizontal component of a distortion is lost. The positive potential level becomes high and the negative potential level becomes low. As a result, the above-described charge cancellation does not occur. Consequently, it is possible to obtain a press detection signal.

Figure 11A:
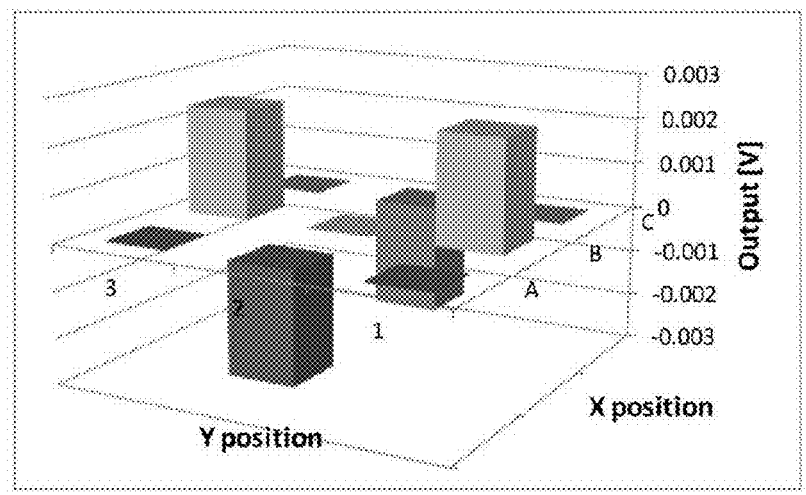
FIGS. 11(A) and 11(B) are views illustrating calculation results of potential distributions produced in the piezoelectric film.
Figure 11B:
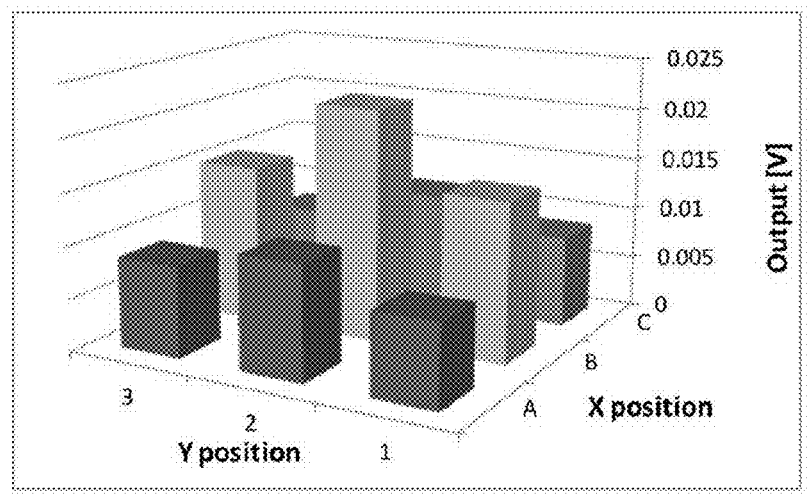
Figure 12:
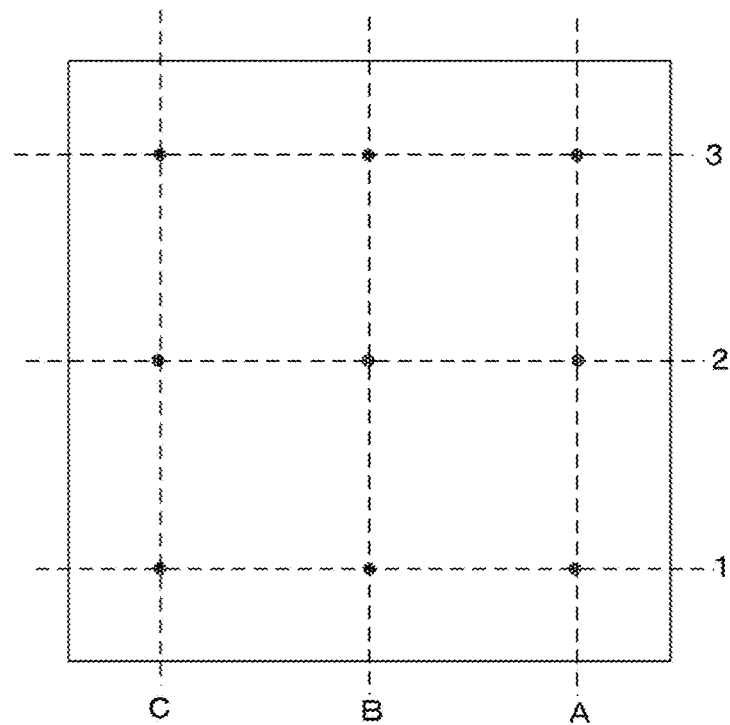
FIG. 12 is a view illustrating a pressing position of the touch panel.

FIG. 11(A) illustrates a voltage calculation result of each of nine pressing positions in FIG. 12 produced in the piezoelectric film 200 when the modulus of the adhesive layer 22 illustrated in FIG. 10(A) is uniform. FIG. 11(B) illustrates a voltage calculation result of each of nine pressing positions in FIG. 12 produced in the piezoelectric film 200 when the modulus of the adhesive layer 22 has the pattern illustrated in FIG. 8. As illustrated in FIG. 11(A), when the modulus of the adhesive layer 22 is uniform, and when a pressing position is on the diagonal line on the piezoelectric film 200 as described above, there is a position at which charges produced by a distortion of the piezoelectric film 200 are cancelled and an output cannot be obtained. Further, the position at which an output can be obtained includes a pressing position, too, at which the polarity is inverted (A-2 or C-2 illustrated in FIGS. 11 and 12). Meanwhile, as in the present embodiment, when the adhesive layer 22 includes areas of different moduli, charges produced by the distortion of the piezoelectric film 200 are not cancelled at all pressing positions, and a sufficient output can be obtained. Further, polarities of outputs are not inverted at all pressing positions, either. Consequently, it is possible to appropriately detect a pressing force irrespectively of pressing positions.

Further, as illustrated in FIG. 8, a method for differing the moduli of the adhesive layer 22 between the areas 22A, 22B and 22C includes, for example, following methods (1) to (3).

Two types of double-sided tapes (OCA) which have different moduli of an adhesive are prepared. The double-sided tape having a lower modulus of the adhesive is cut into shapes of the area 22A and the area 22C. Further, the double-sided tape having a higher modulus of the adhesive is cut into a shape of the area 22B. The cut double-sided tapes having the lower modulus of the adhesive are pasted at positions meeting the area 22A and the area 22C on the fifth principal surface of the main functional unit 20, and the cut double-sided tape having the higher modulus of the adhesive is pasted at a position meeting the area 22B on the fifth principal surface of the main functional unit 20. These double-sided tapes are pasted on the fifth principal surface of the main functional unit 20 without overlapping each other. That is, the cut double-sided tapes of the two types having the different moduli are pasted on the fifth principal surface of the main functional unit 20 like a patchwork. Further, the second principal surface of the plate member 21 is pasted on the fifth principal surface of the main functional unit 20. In this case, the double-sided tapes of the two types pasted on the fifth principal surface of the main functional unit 20 and having the different moduli in the adhesive form the adhesive layer 22.

Further, according to (1), the two types of the transparent double-sided tapes having the different moduli in the adhesive are prepared. However, two types of double-sided tapes whose rates of core materials included in the adhesive are different may be prepared. The double-sided tape having a higher rate of the core material included in the adhesive corresponds to the double-sided tape having the higher modulus of the adhesive in (1). The double-sided tape having a lower rate of the core material included in the adhesive corresponds to the double-sided tape having a lower modulus of the adhesive in (1). Further, in this case, the double-sided tape having the lower rate of the core material included in the adhesive may not include a core material in the adhesive (i.e., the rate of the core material included in the adhesive may be 0).

The double-sided tape having the lower rate of the core material included in the adhesive is cut into shapes of the area 22A and the area 22C. Further, the double-sided tape having the higher rate of the core material included in the adhesive is cut into a shape of the area 22B. The cut double-sided tapes having the lower rate of the core material included in the adhesive are pasted at positions meeting the area 22A and area 22C on the fifth principal surface of the main functional unit 20, and the cut double-sided tape having the higher rate of the core material included in the adhesive is pasted at a position meeting the area 22B on the fifth principal surface of the main functional unit 20. These double-sided tapes are pasted on the fifth principal surface of the main functional unit 20 without overlapping each other. That is, the cut double-sided tapes of the two types having the different rates of the core materials included in the adhesive are pasted on the fifth principal surface of the main functional unit 20 like a patchwork. Further, the second principal surface of the plate member 21 is pasted on the fifth principal surface of the main functional unit 20. In this case, too, the double-sided tapes of the two types pasted on the fifth principal surface of the main functional unit 20 and having the different moduli of the adhesive form the adhesive layer 22.

(3) An adhesive which cures or softens according to an irradiation amount of light ray such as ultraviolet ray, heat ray and radiation is prepared.

As for ultraviolet ray irradiation, it is possible to lower the modulus by lowering a molecular weight of polymer used for the adhesive. Further, as for heat ray irradiation, if the adhesive contains thermosetting resin such as epoxy resin, the adhesive thermally cures, so that it is possible to increase the modulus. In addition, as for thermal curing, it is possible to increase the modulus at a higher speed by using dielectric heating caused by microwave irradiation. As for radiation irradiation, a radiation crosslinking effect re-couples molecules, and a molecular weight increases, so that it is possible to enhance the modulus. The modulus can be increased in this way by containing triallyl isocyanurate which provides the radiation crosslinking effect, in the adhesive. The adhesive is obtained by adding a tackifier, a crosslinking agent, a softener or the like to an elastomer which is a base material. Types of the adhesive include a rubber adhesive for which natural rubber is used, an acrylic adhesive for which acrylic polymer is used, a silicone adhesive for which silicone rubber and silicone resin are mixed at a predetermined ratio, and a urethane adhesive. The acrylic adhesive and the silicone adhesive are mainly used for a highly transparent adhesive used for the touch panel.

The prepared adhesive having the nearly uniform thickness is applied to the entire fifth principal surface of the main functional unit 20, and the second principal surface of the plate member 21 is pasted on the fifth principal surface of the main functional unit 20. For example, the areas 22A, 22B and 22C on the first principal surface of the plate member 21 are masked to adjust the irradiation amount of light ray such as ultraviolet ray, heat ray, radiation or microwaves with respect to each of the areas 22A, 22B and 22C. When the adhesive applied to the fifth principal surface of the main functional unit 20 is the adhesive which is irradiated by light rays and cured, a light ray irradiation amount for the area 22B is increased compared to irradiation amounts of light rays irradiated on the areas 22A and 22C. By contrast with this, when the adhesive applied to the fifth principal surface of the main functional unit 20 is the adhesive which is irradiated by light rays and softened, the light ray irradiation amounts for the areas 22A and 22C is increased compared to the irradiation amount of light ray irradiated on the area 22B. Light rays such as ultraviolet ray, heat ray and microwaves are irradiated on the side of the first principal surface of the plate member 21. In this case, the adhesive applied to the entire fifth principal surface of the main functional unit 20 forms the adhesive layer 22.

Further, the adhesive layer 22 may be formed by using the adhesive layers of three types or more having the different moduli. In this regard, in this case, too, the modulus distribution in the adhesive layer 22 is formed as a distribution which is not line-symmetrical with respect to the axis of symmetry which is a line which is parallel to the stretching direction 210 of the piezoelectric film 200 and is a line which divides the plane opposing to the third principal surface of the piezoelectric film 200 into two.

Figure 13:
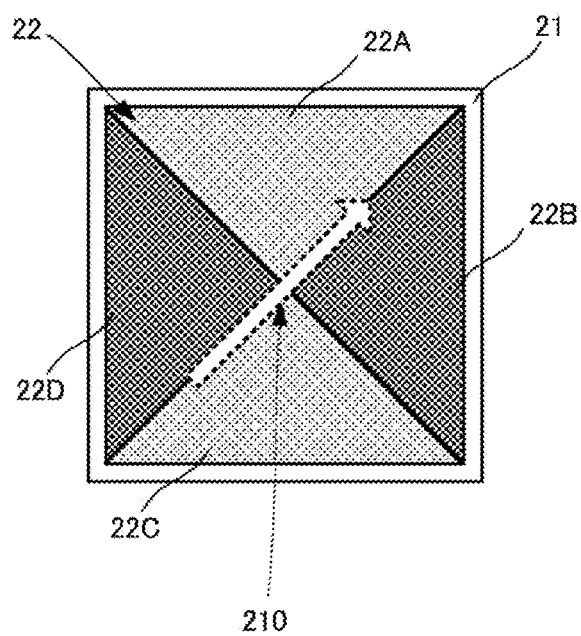
FIG. 13 is a view illustrating a modulus distribution in an adhesive layer of the touch panel according to another embodiment.

Further, as illustrated in FIG. 13, the adhesive layer 22 may be divided into four areas 22A to 22D by two diagonal lines, and moduli may be differed between the areas 22A and 22C and the areas 22B and 22D (the area 22A and the area 22C have the same modulus, and the area 22B and the area 22D have the same modulus). In an example illustrated in FIG. 13, too, the modulus distribution in the adhesive layer 22 is formed as a distribution which is not line-symmetrical with respect to the axis of symmetry which is a line which is parallel to the stretching direction 210 of the piezoelectric film 200 and is a line which divides the plane opposing to the third principal surface of the piezoelectric film 200 into two.

Figure 14A:
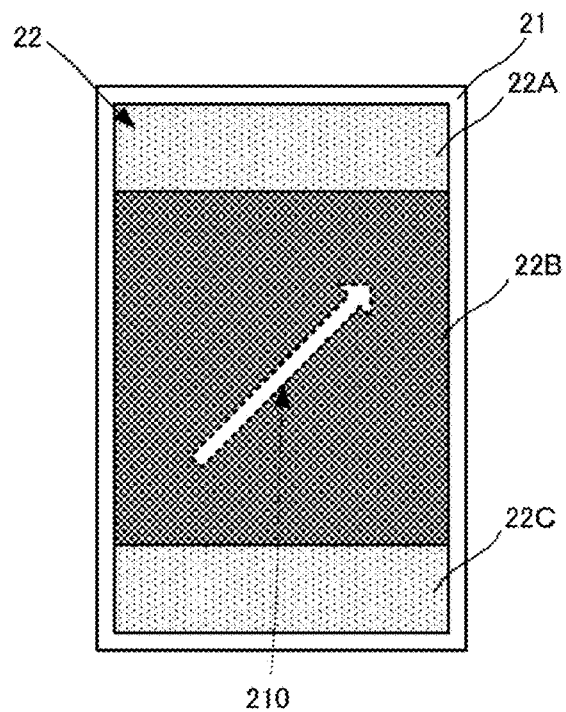
FIGS. 14(A) and 14(B) are views illustrating modulus distributions in an adhesive layer of the touch panel according to another embodiment.
Figure 14B:
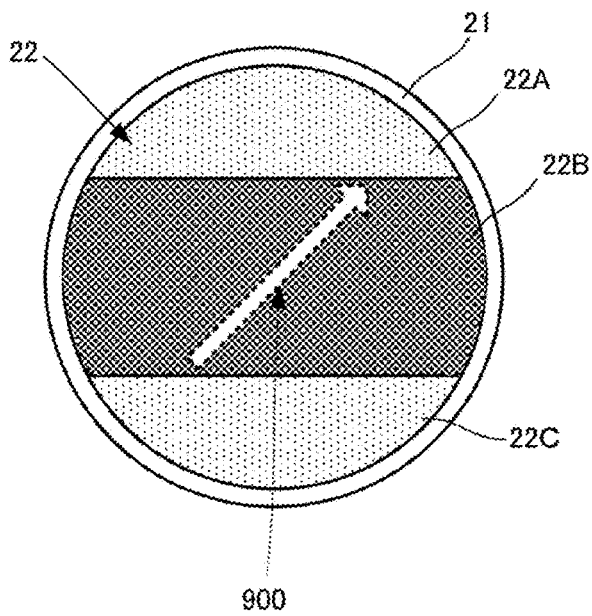

Further, in the above example, the third principal surface and the fourth principal surface of the piezoelectric film 200 are square yet may be rectangular as illustrated in FIG. 14(A) or may be circular as illustrated in FIG. 14(B). FIG. 14 illustrates an example where the adhesive layer 22 is divided into the three areas 22A to 22C. In this case, too, the moduli in the adhesive layer 22 are formed as a distribution which is not line-symmetrical with respect to the axis of symmetry which is a line which is parallel to the stretching direction 210 of the piezoelectric film 200 and is a line which divides the plane opposing to the third principal surface of the piezoelectric film 200 into two.

In addition, it is preferable to make a modulus difference as large as possible to further suppress cancellation of charges in a charge distribution produced in the piezoelectric film 200. According to the study of the inventors, a ratio of a high modulus with respect to a low modulus is preferably twice or more.

Figure 15:
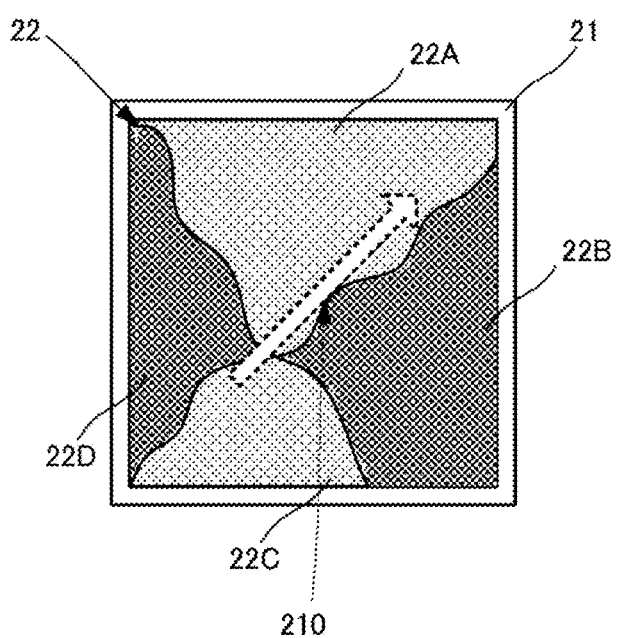
FIG. 15 is a view illustrating a modulus distribution in an adhesive layer of the touch panel according to another embodiment.

Further, a boundary between neighboring areas of different moduli in the adhesive layer 22 may be, for example, a curve as illustrated in FIG. 15 not a line. Thus, it is possible to lower visibility of the boundary between the areas having different moduli, and suppress strangeness which the operator feels.

Further, the number of divided areas having different moduli is not limited to above three or four, and may be any number equal to or more than two.

Furthermore, the configuration of the main functional unit 20 of the touch panel 2 is the configuration disclosed in above-described Patent Document 1 as described above yet may be the configuration disclosed in above-described Patent Document 2 or may be other configurations.

Figure 16A:
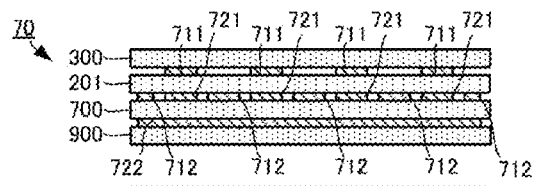
FIG. 16(A) is a side view and FIGS. 16(B) to 16(D) are plan views of a touch panel according to a first modified example.
Figure 16B:
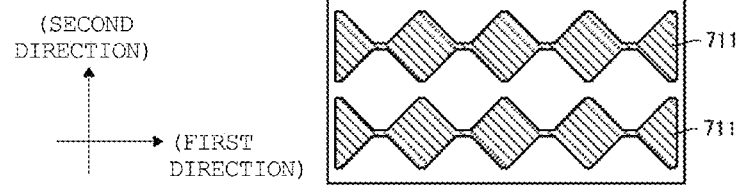
Figure 16C:
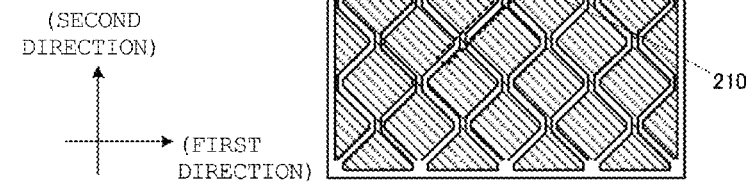
Figure 16D:

For example, the capacitance detection electrodes do not necessarily need to be provided, and at least the piezoelectric film and the piezoelectric voltage detection electrodes need to be provided. Further, for example, the main functional unit 20 may employ configurations illustrated in FIGS. 16(A)-16(D) and 17(A)-17(D). FIG. 16(A) is a side view of a main functional unit 70 of a touch panel according to a first modified example. The main functional unit 70 includes a piezoelectric film 700, a dielectric film 701, protection layers 800 and 900, capacitance detection sub-electrodes 711 and 712, and piezoelectric voltage detection sub-voltages 721 and 722. FIG. 16(B) is a plan view illustrating the dielectric film 701 from a side of an operation surface. FIG. 16(C) is a plan view illustrating the piezoelectric film 700 from the side of the operation (or the dielectric film 701 is seen from a side oppose to the side of the operation). FIG. 16(D) is a plan view illustrating the protection layer 900 from the side of the operation surface.

The piezoelectric film 700 is made of uniaxially stretched poly-L-lactic acid (PLLA). The dielectric film 800 is formed by using an arbitrary dielectric material, and, more preferably, by using a dielectric material having high light-transmissiveness and a low electric field confinement effect. A plurality of first capacitance detection sub-electrodes 711 is formed on a principal surface of the dielectric film 800 at a side opposite to a side of the piezoelectric film 700. A plurality of second capacitance detection sub-electrodes 712 is formed on a principal surface of the dielectric film 800 at the side of the piezoelectric film 700 or on a principal surface (third principal surface) of the piezoelectric film 700 at a side of the dielectric film 800. Similar to the second capacitance detection sub-electrodes 712, a plurality of first piezoelectric voltage detection sub-electrodes 721 is formed on the principal surface of the dielectric film 800 at the side of the piezoelectric film 700 or on a principal surface (third principal surface) of the piezoelectric film 700 at a side of the dielectric film 800. A plurality of second piezoelectric voltage detection sub-electrodes 722 is formed on a principal surface (fourth principal surface) of the piezoelectric film 700 at a side opposite to the side of the dielectric film 800. The second capacitance detection sub-electrodes 712 and the first piezoelectric voltage detection sub-electrodes 721 are configured as the same electrode pattern as that of a fifth principal surface of the piezoelectric film in the previous embodiment, i.e., as an electrode pattern in which the second capacitance detection sub-electrodes 712 and the first piezoelectric voltage detection sub-electrodes 721 extend in a second direction and are alternately aligned in a first direction. The first capacitance detection sub-electrodes 711 are configured as an electrode pattern obtained by removing the first piezoelectric voltage detection sub-electrodes from an electrode pattern of a fourth principal surface of the piezoelectric film according to the previous embodiment, i.e., as a plurality of electrode patterns in which the first capacitance detection sub-electrodes 711 extend in the first direction and are aligned in the second direction. The second piezoelectric voltage detection sub-electrodes 722 are formed according to a rectangular pattern to cover the nearly entire fourth principal surface of the piezoelectric film 700.

The main functional unit 70 of the touch panel may be formed by attaching the capacitance detection sub-electrodes 711 and 712 to the dielectric film 701 instead of the piezoelectric film 700. By so doing, it is possible to relax restriction placed when the piezoelectric voltage detection sub-voltages 721 and 722 are provided, i.e., the restriction of positions and shapes which influence the capacitance detection sub-electrodes 711 and 712 little. Consequently, it is possible to increase opposing areas of the piezoelectric voltage detection sub-voltages 721 and 722. By increasing the opposing areas of the piezoelectric voltage detection sub-voltages 721 and 722, it is possible to increase pressing force detection sensitivity.

In addition, in this case, it is necessary to paste the piezoelectric film 700 and the dielectric film 701. Therefore, it is also possible to use a connection mode of an adhesive which does not target at the above modulus distribution to paste the piezoelectric film 700 and the dielectric film 701. In this regard, when the main functional unit 70 and a plate member are pasted by the above-described connection mode, it is also possible to use another connection mode to paste the piezoelectric film 700 and the dielectric film 701. By contrast with this, when the piezoelectric film 700 and the dielectric film 701 are pasted by the above-described connection mode, it is also possible to use another connection mode to paste the main functional unit 70 and the plate member. In such a case, the plate member and the dielectric film configure an operation input member.

Figure 17A:
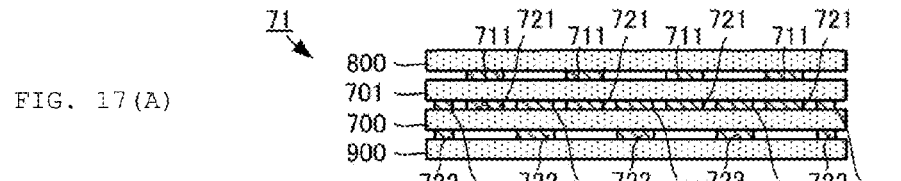
FIG. 17(A) is a side view and FIGS. 17(B) to 17(D) are plan views of a touch panel according to a second modified example.
Figure 17B:
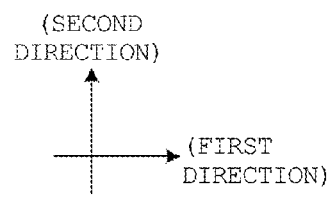
Figure 17B:
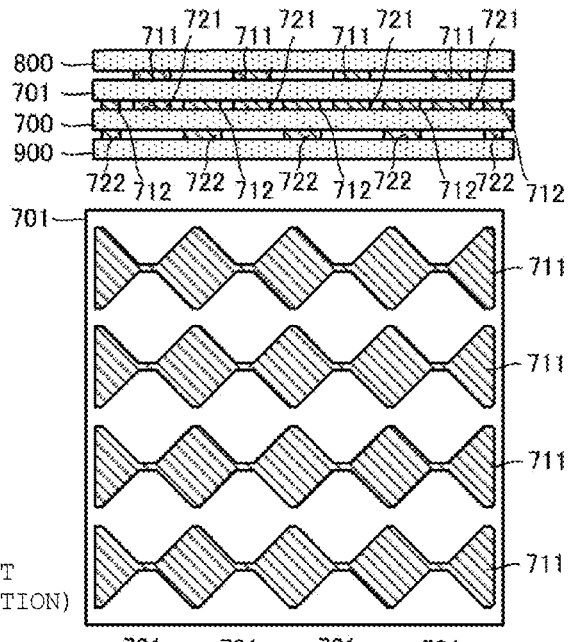
Figure 17C:
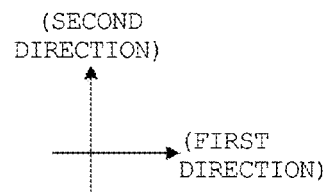
Figure 17C:
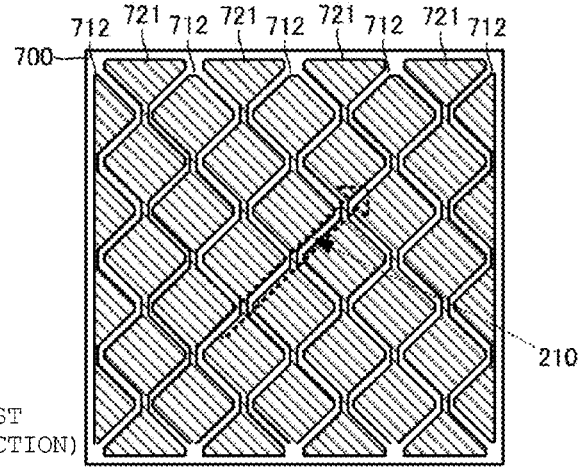
Figure 17D:
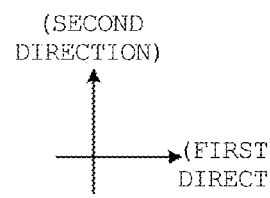
Figure 17D:
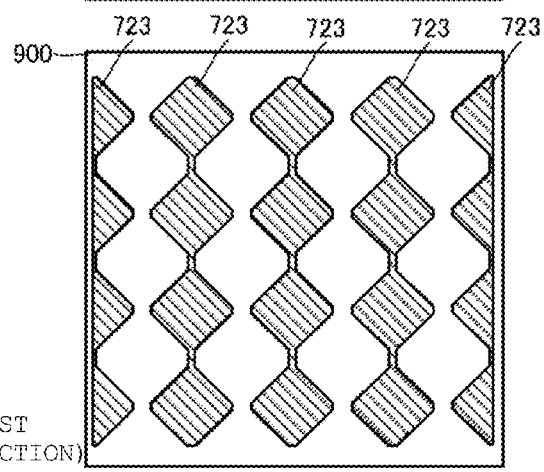

FIG. 17(A) is a side view of a main functional unit 71 of a touch panel according to a second modified example. The main functional unit 71 includes a piezoelectric film 700, a dielectric film 701, protection layers 800 and 900, capacitance detection sub-electrodes 711 and 712, and piezoelectric voltage detection sub-voltages 721 and 723. FIG. 17(B) is a plan view illustrating the dielectric film 701 from a side of an operation surface. FIG. 17(C) is a plan view illustrating the piezoelectric film 700 from the side of the operation (or the dielectric film 701 is seen from a side oppose to the side of the operation). FIG. 17(D) is a plan view illustrating the protection layer 900 from the side of the operation surface.

The main functional unit 71 employs the same configuration as that according to the first modified example except for the piezoelectric voltage detection sub-voltages 723. The piezoelectric voltage detection sub-voltages 723 are configured as the same electrode pattern as that of the opposing piezoelectric voltage detection sub-voltages 721. That is, the piezoelectric voltage detection sub-voltages 723 are configured to extend in a second direction and be aligned in a first direction.

By configuring the main functional unit 71 of the touch panel as described above, it is possible to make the piezoelectric voltage detection sub-voltages 721 and 722 hardly oppose to the capacitance detection electrodes 711 and 712. Consequently, it is possible to suppress unnecessary electric field coupling caused between the piezoelectric voltage detection sub-voltages 721 and 722 and the capacitance detection electrodes 711 and 712. Consequently, it is possible to prevent drive signals of the capacitance detection electrodes 711 and 712 from transmitting to the piezoelectric voltage detection sub-voltages 721 and 722 and from becoming noise of a piezoelectric voltage, and further increase pressing force detection sensitivity.

Thus, the specific configuration of the touch panel according to the present invention can be arbitrary configurations within the scope of the claims.

DESCRIPTION OF REFERENCE SYMBOLS

1: INPUT OPERATION TERMINAL
2: TOUCH PANEL
3: INDICATOR
4: CONTROL SUBSTRATE
5: HOUSING
20: MAIN FUNCTIONAL UNIT
21: PLATE MEMBER
22: ADHESIVE LAYER
22A, 22B, 22C, 22D: AREA
200: PIEZOELECTRIC FILM
200ST: THIRD PRINCIPAL SURFACE
200SB: FOURTH PRINCIPAL SURFACE
211A-211L: FIRST CAPACITANCE DETECTION SUB-ELECTRODE
213A-213L: FIRST PIEZOELECTRIC VOLTAGE DETECTION SUB-ELECTRODE
221A-221L: SECOND CAPACITANCE DETECTION SUB-ELECTRODE
223A-223L: SECOND PIEZOELECTRIC VOLTAGE DETECTION SUB-ELECTRODE
300, 400: PROTECTION LAYER

The invention claimed is:

1. A touch panel comprising:
a plate member which includes a first principal surface and a second principal surface opposing each other, and is constructed so as to be distorted in response to a force applied to the first principal surface;
a pressing force detecting sensor which includes:
a piezoelectric film having a third principal surface and a fourth principal surface opposing each other;
a first set of piezoelectric voltage detection electrodes disposed at a side of the third principal surface of the piezoelectric film; and
a second set of piezoelectric voltage detection electrodes disposed at a side of the fourth principal surface of the piezoelectric film,
the first set and second set of piezoelectric voltage detection electrodes detecting a piezoelectric voltage corresponding to a distortion amount of the piezoelectric film; and
an adhesive layer between the second principal surface of the plate member and the third principal surface of the piezoelectric film and which adheres the plate member to the pressing force detecting sensor, and wherein the adhesive layer including a plurality of areas along a plane parallel to the third principal surface of the piezoelectric film, and at least two areas of the plurality of areas have different moduli.

2. The touch panel according to claim 1, wherein the piezoelectric film is polylactic acid.

3. The touch panel according to claim 2, wherein piezoelectric film is a uniaxial stretched piezoelectric film.

4. The touch panel according to claim 3, wherein, with respect to a line which is parallel to a stretching direction of the piezoelectric film and which divides the third principal surface of the piezoelectric film into two sections, a distribution of the different moduli is not line-symmetrical.

5. The touch panel according to claim 4, wherein a boundary between two neighboring areas of the different moduli of the adhesive layer is not linear.

6. The touch panel according to claim 5, wherein a modulus of each of the plurality of areas of the adhesive layer is one of a first modulus and a second modulus.

7. The touch panel according to claim 6, wherein a ratio of the first modulus with respect to the second modulus is twice or more.

8. The touch panel according to claim 1, wherein a boundary between two neighboring areas of the different moduli of the adhesive layer is not linear.

9. The touch panel according to claim 8, wherein a modulus of each of the plurality of areas of the adhesive layer is one of a first modulus and a second modulus.

10. The touch panel according to claim 9, wherein a ratio of the first modulus with respect to the second modulus is twice or more.

11. The touch panel according to claim 1, wherein the adhesive layer is a material having a property that a modulus thereof changes according to an amount of ultraviolet ray irradiation.

12. The touch panel according to claim 1, wherein the adhesive layer is a material having a property that a modulus thereof changes according to an amount of heat ray irradiation.

13. The touch panel according to claim 1, wherein the adhesive layer is a material having a property that a modulus thereof changes according to an amount of radiation irradiation.

14. The touch panel according to claim 1, wherein the adhesive layer is a material having a property that a modulus thereof changes according to an amount of microwave irradiation.

15. The touch panel according to claim 1, wherein the adhesive layer has a uniform thickness.

16. The touch panel according to claim 1, wherein a material of the plate member is selected from the group consisting of glass, polyethylene terephthalate, polycarbonate, and acryl.

17. The touch panel according to claim 1, wherein a material of the adhesive layer is selected from the group consisting of a rubber adhesive, an acrylic adhesive, a silicone adhesive, and a urethane adhesive.

* * * * *